(12) United States Patent
Kani et al.

(10) Patent No.: US 8,702,823 B2
(45) Date of Patent: Apr. 22, 2014

(54) HYDROGEN GENERATION APPARATUS, FUEL CELL SYSTEM AND METHOD OF SHUTTING DOWN HYDROGEN GENERATION APPARATUS

(75) Inventors: Yukimune Kani, Osaka (JP); Seiji Fujihara, Osaka (JP)

(73) Assignee: Panasonic Corporation, Osaka (JP)

( * ) Notice: Subject to any disclaimer, the term of this patent is extended or adjusted under 35 U.S.C. 154(b) by 810 days.

(21) Appl. No.: 12/933,349

(22) PCT Filed: Jan. 19, 2010

(86) PCT No.: PCT/JP2010/000256
§ 371 (c)(1),
(2), (4) Date: Sep. 17, 2010

(87) PCT Pub. No.: WO2010/082507
PCT Pub. Date: Jul. 22, 2010

(65) Prior Publication Data
US 2011/0014528 A1 Jan. 20, 2011

(30) Foreign Application Priority Data
Jan. 19, 2009 (JP) .................. 2009-009119

(51) Int. Cl.
*C01B 3/36* (2006.01)
*C01B 6/24* (2006.01)
*C01B 3/12* (2006.01)

(52) U.S. Cl.
USPC ......... 48/197 R; 422/625; 422/626; 422/627; 423/644; 423/655

(58) Field of Classification Search
CPC .............. C01B 3/02; C01B 3/12; C01B 3/14; C01B 3/16; C01B 3/32; C01B 2203/1609
USPC ............................. 48/61; 423/644
See application file for complete search history.

(56) References Cited

U.S. PATENT DOCUMENTS 4,721,611 A * 1/1988 Pinto et al. .................. 423/655
5,110,559 A   5/1992 Kondo et al.
(Continued)

FOREIGN PATENT DOCUMENTS

EP   1 256 545 A1   11/2002
EP   1 386 882 A1   2/2004
(Continued)

OTHER PUBLICATIONS

Machine Translation and English Language Abstract of JP2000-219501A (Aug. 22, 2013).*

(Continued)

*Primary Examiner* — Matthew Merkling
(74) *Attorney, Agent, or Firm* — McDermott Will & Emery LLP

(57) ABSTRACT

A method of shutting down a hydrogen generation apparatus for limiting degradation in a catalyst due to dew condensation at the time of shutdown is provided. The method of shutting down the hydrogen generation apparatus comprising, a combustor which supplies heat necessary to a reforming device, a first air supplier which supplies air to the combustor, a combustion exhaust gas path formed such that the combustion exhaust gas produced in the combustor makes heat exchange with the reforming device and then with a CO reducing device, and a controller which operates the first air supplier so that the temperature of the gas in the CO reducing device does not become equal to or lower than a dew point after shutdown of the combustion operation of the combustor and before a start of a purging operation to purge the interiors of the reforming device and the CO reducing device with a replacement gas.

11 Claims, 31 Drawing Sheets

(56) References Cited

U.S. PATENT DOCUMENTS

| | | | |
|---|---|---|---|
| RE39,675 E * | 6/2007 | Kudo et al. | 422/198 |
| 2004/0037761 A1* | 2/2004 | Maenishi et al. | 422/198 |
| 2004/0082471 A1* | 4/2004 | Ilinich et al. | 502/346 |
| 2006/0201064 A1* | 9/2006 | Wheat et al. | 48/197 R |
| 2007/0006530 A1* | 1/2007 | Maenishi et al. | 48/198.7 |
| 2007/0196267 A1* | 8/2007 | Carpenter et al. | 423/648.1 |
| 2008/0311446 A1 | 12/2008 | Lee et al. | |

FOREIGN PATENT DOCUMENTS

| | | | |
|---|---|---|---|
| EP | 1 557 395 A2 | 7/2005 | |
| JP | 2000219501 A * | 8/2000 | C01B 3/32 |
| JP | 2004-200065 | 7/2004 | |
| JP | 2004-228016 | 8/2004 | |
| JP | 2004-307236 | 11/2004 | |
| JP | 2006-008459 | 1/2006 | |
| JP | 2006-278120 | 10/2006 | |
| JP | 2008-063159 | 3/2008 | |
| JP | 2008-201638 A | 9/2008 | |
| JP | 2008-266118 | 11/2008 | |
| JP | 2009-004346 | 1/2009 | |

OTHER PUBLICATIONS

European Search Report issued in European Application No. 10731176.3 mailed Nov. 27, 2013.

* cited by examiner

Fig.5 (Example 1)

Fig.6 (Comparative Example 1)

Fig. 10 (Comparative Example 2)

(Comparative Example 3)

Fig.22 (Example 5)

Fig.23 (Comparative Example 5)

HYDROGEN GENERATION APPARATUS, FUEL CELL SYSTEM AND METHOD OF SHUTTING DOWN HYDROGEN GENERATION APPARATUS

CROSS-REFERENCE TO RELATED APPLICATIONS

This application is a U.S. national phase application of PCT International Patent Application No. PCT/JP2010/000256 filed Jan. 19, 2010, claiming the benefit of priority of Japanese Patent Application No. 2009-009119 filed Jan. 19, 2009, all of which are incorporated by reference herein in their entirety.

TECHNICAL FIELD

The present disclosure relates to a hydrogen generation apparatus which generates a gas containing hydrogen by reforming reaction between a raw material and water, a fuel cell system and a method of shutting down the hydrogen generation apparatus.

BACKGROUND ART

Development of fuel cells capable of high-efficiency power generation even in a small unit and using hydrogen gas or a gas containing hydrogen as fuel is being pursued to develop the fuel cells as a power generation system for distributed energy supply sources. However, no general infrastructure for hydrogen gas or a gas containing hydrogen for fuel at power generation has been developed. There is, therefore, a need to utilize a raw material supplied from an existing infrastructure for supply of a fossil raw material such as city gas or propane gas, and to provide, in combination with a fuel cell, a hydrogen generation apparatus which generates a gas containing hydrogen by reforming reaction between the raw material and water.

The hydrogen generation apparatus typically includes ordinarily constituted by a reforming unit in which a reforming reaction between a raw material and water is caused, a converting unit in which water gas shift reaction between carbon monoxide and water vapor is caused, and a selective oxidation unit in which carbon monoxide is oxidized.

In the reaction units, catalysts suitable for the reactions are used. For example, a Ru catalyst or a Ni catalyst is used in the reforming unit, a Cu—Zn catalyst is used in the converting unit, and a Ru catalyst or the like is used in the selective oxidation unit. There is a suitable temperature in each reaction unit. In most cases, the reforming unit is used at about 650° C., the converting unit at about 200° C., and the selective oxidation unit at about 150° C.

When the operation of the hydrogen generation apparatus as described above is shut down, there is a need to purge the interior of the hydrogen generation apparatus with an inert gas in order to limit oxidation of and dew condensation on the catalysts provided in the reforming unit, the converting unit and the selective oxidation unit. However, it is not easy to keep an inert gas prepared at all times in the case where the apparatus is installed in a home. A method of using a raw material gas as an inert gas has therefore been proposed (see, for example, Patent Literature 1).

In an apparatus in Patent Literature 1, the supply of a raw material gas is stopped immediately after shutdown of the operation of a hydrogen generation apparatus; the interior of the apparatus is purged with water vapor; cooling is performed until the temperature of converting catalysts in the apparatus are reduced to predetermined temperatures; and water vapor is thereafter forced out with the raw material gas.

According to the shutdown method in Patent Literature 1, however, the reforming catalyst is exposed only to water vapor at a high temperature for a certain time period and there is, therefore, a possibility of the reforming catalyst being degraded.

A method has been disclosed in which after a stop of the supply of a raw material and water at the time of shutdown, natural cooling is performed by standing for a certain time period without supplying water vapor, and the interior of the apparatus is thereafter purged with a raw material gas (see, for example, Patent Literature 2).

CITATION LIST

Patent Literature

Patent Literature 1: Japanese Patent Laid-Open No. 2004-200065
Patent Literature 2: Japanese Patent Laid-Open No. 2004-307236

SUMMARY OF INVENTION

Technical Problem

With Patent Literature 2, however, there is a possibility of dew condensation occurring in the converting unit or the selective oxidation unit under some condition to cause degradation of the catalyst or a reduction in strength of the catalyst.

In view of the problems of the conventional hydrogen generation apparatus described above, an object of the present disclosure is to provide a hydrogen generation apparatus capable of limiting degradation of a catalyst due to dew condensation at the time of shutdown in comparison with the conventional hydrogen generation apparatus, a fuel cell system and a method of shutting down the hydrogen generation apparatus.

A first aspect of the present disclosure is a method of shutting down a hydrogen generation apparatus comprising a raw material supplier which supplies a raw material, a water supplier which supplies water, a reforming device having a reforming catalyst for generating a gas containing hydrogen through reforming reaction using the raw material and water, a CO reducing device having a CO reducing catalyst for reducing carbon monoxide in the gas containing hydrogen delivered from the reforming device, a combustor which supplies heat necessary for the reforming reaction to the reforming device, a first air supplier which supplies air for combustion to the combustor, and a combustion exhaust gas path formed such that the combustion exhaust gas exhausted from the combustor makes heat exchange with the reforming device and then with the CO reducing device, the method comprising:

a first step of stopping the combustion operation of the combustor; and a second step of operating the first air supplier so that the temperature of the gas in the CO reducing device does not become equal to or lower than a dew point after shutdown of the combustion operation of the combustor and before a start of a purging operation to purge the interiors of the reforming device and the CO reducing device with a replacement gas.

A second aspect of the present disclosure is the method of shutting down a hydrogen generation apparatus according to the first aspect of the present disclosure, wherein, in the second step, the first air supplier is intermittently operated and controlled so that the gas temperature in the CO reducing device does not become equal to or lower than the dew point.

A third aspect of the present disclosure is the method of shutting down a hydrogen generation apparatus according to the second aspect of the present disclosure, wherein, in the second step, the first air supplier is operated when the gas temperature in the CO reducing device is equal to or lower than a first temperature higher than the dew point.

A fourth aspect of the present disclosure is the method of shutting down a hydrogen generation apparatus according to the third aspect of the present disclosure, wherein, the operation of the first air supplier is stopped when the gas temperature in the CO reducing device becomes equal to or higher than a second temperature higher than the first temperature as a result of the operation of the first air supplier in the second step.

A fifth aspect of the present disclosure is the method of shutting down a hydrogen generation apparatus according to the third aspect of the present disclosure, wherein, the operation of the first air supplier is stopped when the gas temperature in the CO reducing device does not become equal to or higher than a second temperature higher than the first temperature as a result of the operation of the first air supplier in the second step.

A sixth aspect of the present disclosure is the method of shutting down a hydrogen generation apparatus according to the fifth aspect of the present disclosure, wherein, the hydrogen generation apparatus comprises a heater which heats the CO reducing device, the heater is operated when the second temperature is not reached or exceeded in the second step.

A seventh aspect of the present disclosure is the method of shutting down a hydrogen generation apparatus according to the first aspect of the present disclosure, wherein, in the second step, when the temperature of the reforming device is equal to or higher than a third temperature, the first air supplier is operated and controlled so that the gas temperature in the CO reducing device does not become equal to or lower than the dew point.

A eighth aspect of the present disclosure is the method of shutting down a hydrogen generation apparatus according to the seventh aspect of the present disclosure, wherein, the hydrogen generation apparatus comprises a heater which heats the CO reducing device, in the second step, when the temperature of the reforming device is lower than the third temperature, the heater is operated and controlled so that the gas temperature in the CO reducing device does not become equal to or lower than the dew point.

A ninth aspect of the present disclosure is the method of shutting down a hydrogen generation apparatus according to the first aspect of the present disclosure, wherein, the hydrogen generation apparatus comprises a heater which heats the CO reducing device, in the second step, the first air supplier is operated and the heater is operated.

A tenth aspect of the present disclosure is the method of shutting down a hydrogen generation apparatus according to the first aspect of the present disclosure, wherein, the CO reducing device is at least one of a converting device, a CO oxidizing device, and a CO methanizer.

A eleventh aspect of the present is disclosure a method of operating a fuel cell system comprising a hydrogen generation apparatus which comprises a raw material supplier which supplies a raw material, a water supplier which supplies water, a reforming device having a reforming catalyst for generating a gas containing hydrogen through reforming reaction using the raw material and water, a CO reducing device having a CO reducing catalyst for reducing carbon monoxide in the gas containing hydrogen delivered from the reforming device, a combustor which supplies heat necessary for the reforming reaction to the reforming device, a first air supplier which supplies air for combustion to the combustor, and a combustion exhaust gas path formed such that the combustion exhaust gas exhausted from the combustor makes heat exchange with the reforming device and then with the CO reducing device, and a fuel cell which generates electric power by using the gas containing hydrogen supplied from the hydrogen generation apparatus, the method comprising:

a first step of stopping the combustion operation of the combustor; and a second step of operating the first air supplier so that the temperature of the gas in the CO reducing device does not become equal to or lower than a dew point after shutdown of the combustion operation of the combustor and before a start of a purging operation to purge the interiors of the reforming device and the CO reducing device with a replacement gas.

Effect of the Disclosure

According to the present disclosure, a hydrogen generation apparatus, a fuel cell system and a method of shutting down the hydrogen generation-apparatus are provided that can suppress degradation of a catalyst due to dew condensation at the time of shutdown.

DESCRIPTION OF EMBODIMENTS

Embodiments of the present disclosure will be described with reference to the drawings.

Embodiment 1

A hydrogen generation apparatus and the configuration of a fuel cell system having the hydrogen generation apparatus in Embodiment 1 of the present disclosure will first be described.

Figure 1:
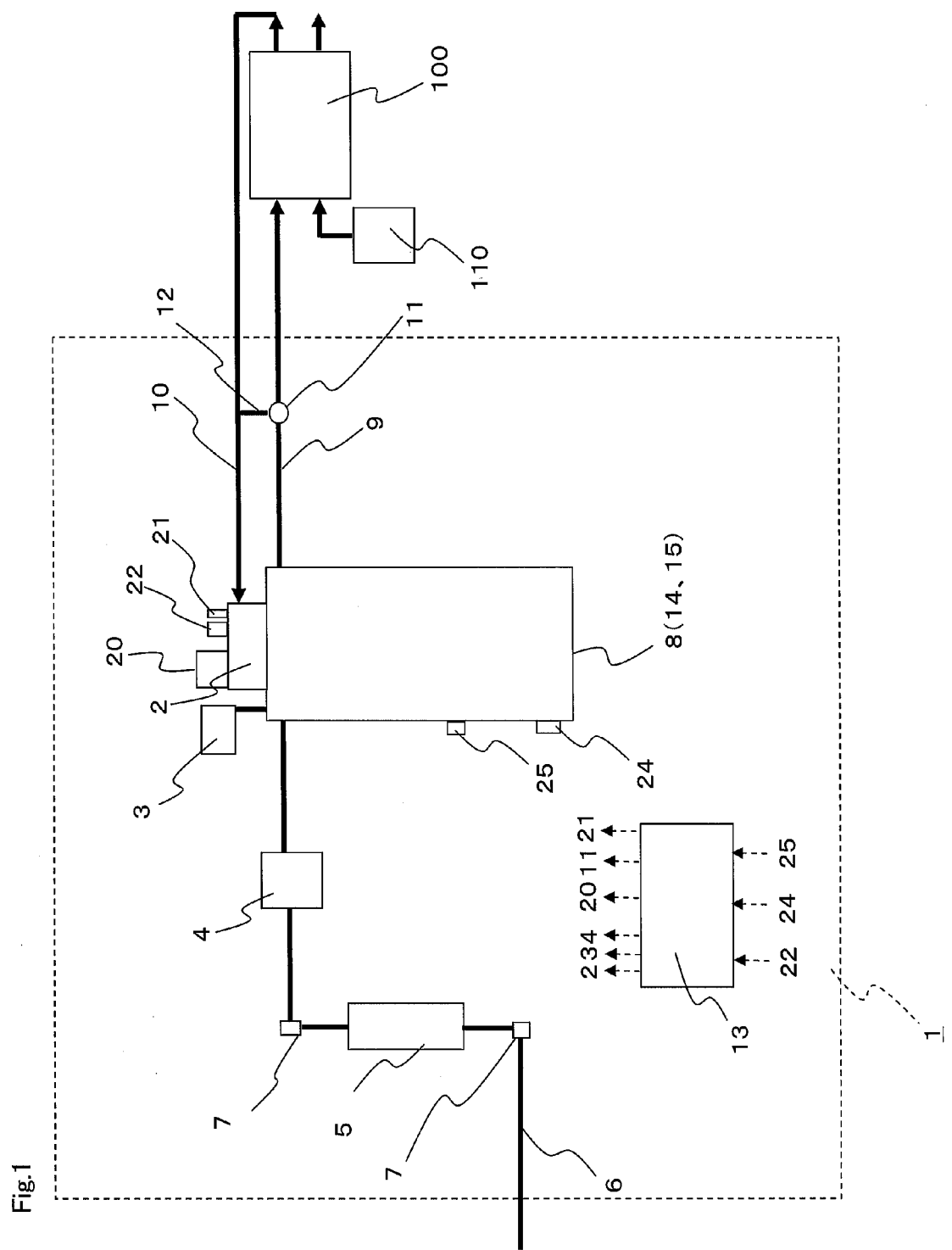
FIG. 1 is a configuration diagram of a hydrogen generation apparatus and a fuel cell system in Embodiment 1 of the present disclosure.

FIG. 1 is a configuration diagram of a hydrogen generation apparatus and a fuel cell system having the hydrogen generation apparatus in Embodiment 1 of the present disclosure. The fuel cell system in the present embodiment has a hydrogen generation apparatus 1 and a fuel cell 100. The hydrogen generation apparatus 1 is an apparatus which generates a gas containing hydrogen mainly by causing progress in reforming reaction between water vapor and a raw material containing an organic compound such as hydrocarbon constituted at least of carbon and hydrogen, e.g., city gas containing methane as a main constituent, natural gas or LPG. The fuel cell 100 is an apparatus which generates electric power by using as an anode gas the gas containing hydrogen supplied from the hydrogen generation apparatus 1, by using as a cathode gas an oxidizer such as air separately supplied, and by causing the two gases to react with each other.

The configuration of the hydrogen generation apparatus 1 surrounded by the dotted line in FIG. 1 will be described.

The hydrogen generation apparatus 1 is provided with a hydrogen generator 8 which generates the gas containing hydrogen from the raw material and water vapor. The hydrogen generator 8 is provided with a combustor 2 which generates heat for progress in reforming reaction. As a combustible gas acting as a heating source in the combustor 2, the raw material passed through the hydrogen generator 8, anode off gas expelled from the anode of the fuel cell 100, or the like is used.

A water supplier 3 which is a pump for supplying water to the hydrogen generator 8 and a raw material supplier 4 which supplies the raw material are provided on the hydrogen generation apparatus 1. The raw material supplier 4 is a booster pump for adjusting the flow rate by controlling, for example, input current pulses or input electric power. The water supplier 3 is a pump having a flow rate adjustment function, as in the case of the raw material supplier 4.

A gas infrastructure path 6 is used as a raw material supply source. A desulfurizer 5 filled with a desulfurizing agent is connected to the gas infrastructure path 6 through a connection portion 7 and is connected to the raw material supplier 4. A hydrogen gas supply path 9 for supplying the fuel cell 100 with the gas containing hydrogen generated by the hydrogen generator 8 is also provided. Further, an anode off gas supply path 10 for supplying the combustor 2 with the gas containing hydrogen not consumed in the fuel cell 100 is provided. Also, a three-way valve 11 is provided at an intermediate position in the hydrogen gas supply path 9, and a bypass path 12 which connects the three-way valve 11 and the anode off gas supply path 10 by bypassing the fuel cell 100 is provided. Also, an oxidizer gas supplier 110 which supplies air as an oxidizer gas to the fuel cell 100 is provided.

The construction of the hydrogen generator 8 will be described.

Figure 2:
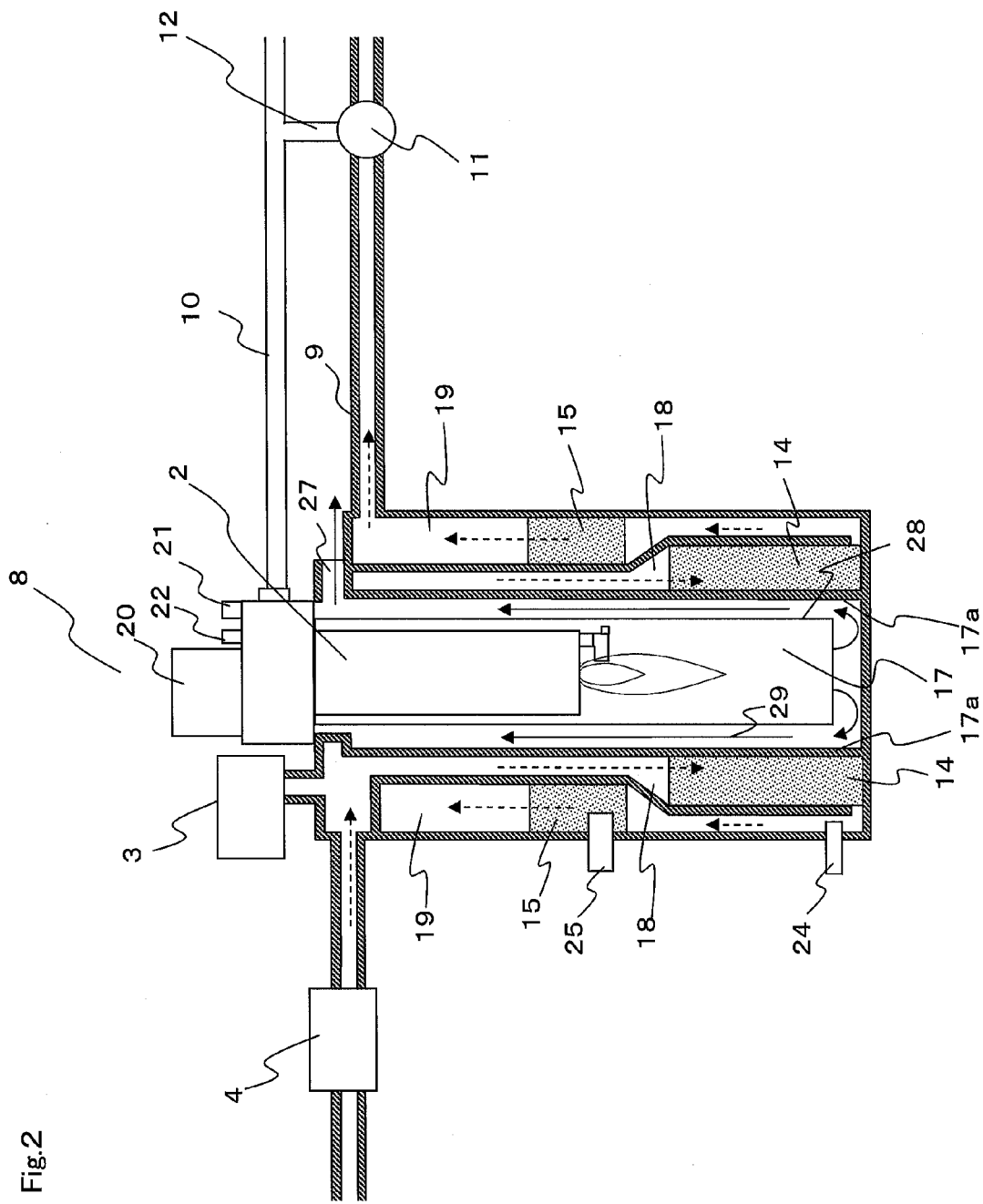
FIG. 2 is a sectional view of the construction of a hydrogen generator in Embodiment 1 of the present disclosure.

FIG. 2 is a sectional view of the construction of the hydrogen generator 8. In the hydrogen generator 8, a reforming device 14 which causes progress in reforming reaction using the raw material and water vapor and a converting device 15 which causes converting reaction between carbon monoxide in the gas containing hydrogen generated by the reforming device 14 and water vapor are provided. The above-described reforming reaction may be either one of water vapor reforming reaction and autothermal reforming reaction. In the case of autothermal reforming reaction, a first air supplier not shown in the figure, which supplies the reforming device 14 with air, is provided.

The hydrogen generator 8 is tubular and has the combustor 2 which is a burner for supplying reaction heat necessary for reforming reaction, and three annular spaces formed by a plurality of cylinders disposed concentrically on a combustion space 17 above the combustor 2. The three annular spaces are a first annular space 18 formed on the outer side of the combustion space 17, a second annular space 19 formed on the outer side of the first annular space 18 and a third annular space 29 formed on the inner side of the first annular space.

An igniter 21 serving as an ignition source for the combustor 2, a flame rod 22 for sensing the state of combustion in the combustor 2 and a first air supplier 20 for supplying the combustor 2 with air for combustion are also provided.

The first air supplier 20 is constituted by a fan for example.

The first annular space 18 is formed so that the width of a lower annular space therein is larger than that of an upper annular space therein. The lower annular space is filled with a Ni-based reforming catalyst to form the reforming device 14. The second annular space 19 is formed so that the width of an upper annular space therein is larger than that of a lower annular space therein. The upper annular space is filled with a Cu—Zn-based converting catalyst to form the converting device 15.

The raw material supplier 4 and an upper portion of the annular space 18 are connected to each other. The first annular space 18 and the second annular space 19 are connected to each other through their lower portions. The hydrogen gas supply path 9 is connected to an upper portion of the second annular space 19. That is, the raw material supplied from the raw material supplier 4 moves downward from above through the first annular space 18 by passing through the reforming device 14, thereafter moves upward from below through the second annular space 19 by passing through the converting device 15, and is discharged from the hydrogen generator 8 to be supplied to the fuel cell 100 through the hydrogen gas supply path 9 (see, dotted line arrows in FIG. 2).

The combustor 2 is disposed so that flame goes out downward therefrom. Combustion exhaust gas produced by combustion in the combustor 2 moves downward through the combustion space 17 in a combustion cylinder 28, is discharged from the downstream end of the combustion cylinder 28 and then turned backward, moves upward through the third annular space between the combustion cylinder 28 and a wall 17a, and is discharged to the outside of the hydrogen generator 8 through an exhaust port 27 (see solid line arrows in the figure). The third annular space corresponds to a combustion exhaust gas path 29. Heat contained in the combustion exhaust gas is transferred to the reforming device 14 and the converting device 15 through the wall 17a to heat the reforming device 14 and the converting device 15, thereby causing reactions therein.

A first temperature sensor 24 and a second temperature sensor 25 are respectively provided on the reforming device 14 and the converting device 15 to sense the catalyst temperatures in the reforming device 14 and the converting device 15. As each temperature sensor, a thermocouple, a thermistor or the like is used. The first temperature sensor 24 is disposed outside the reforming device 14 and in the vicinity of the outlet of the reforming device 14. The second temperature sensor 25 is disposed in the converting device 15.

An operation controller 13 is provided to which detection values from the flame rod 22, the first temperature sensor 24 and the second temperature sensor 25 are input, and which controls functioning of components including the raw material supplier 4, the water supplier 3, the first air supplier 20, the three-way valve 11 and the igniter 21 (see FIG. 1). The operation controller 13 uses a semiconductor memory and a CPU or the like, stores an operational functioning sequence of the hydrogen generation apparatus 1 and operation information including the raw material integrated flow rate, computes suitable functioning conditions according to conditions, and designates the functioning conditions for the components necessary for the system operation, including the water supplier 3 and the raw material supplier 4.

Functioning of the hydrogen generation apparatus and the fuel cell system having the hydrogen generation apparatus in Embodiment 1 will now be described.

Startup and operational functioning of the hydrogen generation apparatus and the fuel cell system having the hydrogen generation apparatus in Embodiment 1 will first be described.

When the hydrogen generation apparatus 1 is started from a shut-down state, the raw material is supplied from the raw material supplier 4 to the hydrogen generator 8 at a command from the operation controller 13. At this time, the three-way valve 11 is at a selected position on the bypass path 12 side. Accordingly, the raw material discharged from the hydrogen generator 8 is supplied to the combustor 2 via the bypass path 12. The raw material used as a fuel is ignited in the combustor 2 to start heating. After determining on the basis of temperature information obtained from the first temperature sensor 24 and the second temperature sensor 25 that a state in which dew condensation does not occur on each of catalyst layers in the reforming device 14 and the converting device 15 has been established, the water supplier 3 is operated to supply water to the hydrogen generator 8 to start reforming reaction between the water and the raw material.

In the present Embodiment 1, city gas (13A) having methane as a main constituent is used as the raw material. Water is supplied at such a rate that about 3 mols of water vapor exists with respect to 1 mol of carbon atoms in the average molecular formula of the supplied city gas (about 3 in terms of steam carbon ratio (S/C)).

The reforming device 14 and the converting device 15 are warmed and reforming reaction and converting reaction progress. When the concentration of carbon monoxide in the gas containing hydrogen is reduced to such a concentration that power generation in the fuel cell can be continued, the three-way valve 11 is changed to the fuel cell 100 side to supply the gas containing hydrogen from the hydrogen gas supply path 9 to the fuel cell 100. The temperature of the reforming device 14 at the time of power generation is about 650° C., and the temperature of the converting device 15 is about 150 to 200° C.

In this case, the dew point of the mixture gas of the raw material and water vapor at the inlet of the reforming device 14 is about 93° C., and the gas dew point at the outlet of the reforming device 14 is about 68° C. The dew point of the gas at the outlet of the converting device 15 is about 61° C.

Then, in the fuel cell 100, power generation is performed by using air supplied from the oxidizer gas supplier 110 and the gas containing hydrogen.

A method of shutting down the operation of the hydrogen generation apparatus and the fuel cell system having the hydrogen generation apparatus in Embodiment 1 of the present disclosure will be described.

At a shutdown command to shut down the operation of the fuel cell system, the oxidizer gas supplier 110 is shut down and the operation of the hydrogen generation apparatus 1 is also shut down.

The outline of the method of shutting down the operation of the hydrogen generation apparatus 1 will be described. By stopping the supply of the raw material and water, the combustion in the combustor 2 is also stopped and the temperature of the catalyst layers in the reforming device 14 and the converting device 15 in the hydrogen generator 8 are reduced. After the temperature of the catalyst layers have been reduced to set temperatures, the raw material is supplied to the hydrogen generation apparatus 1 to replace with the raw material the gas containing hydrogen staying in the gas paths in the hydrogen generation apparatus 1.

Specific functioning in the present embodiment resides in functioning of the operation controller 13 at the time of apparatus shutdown according to the shutdown method described below. The three-way valve 11 is opened on the fuel cell 100 side to perform replacement with the raw material gas in the fuel cell 100 as well.

Figure 3:
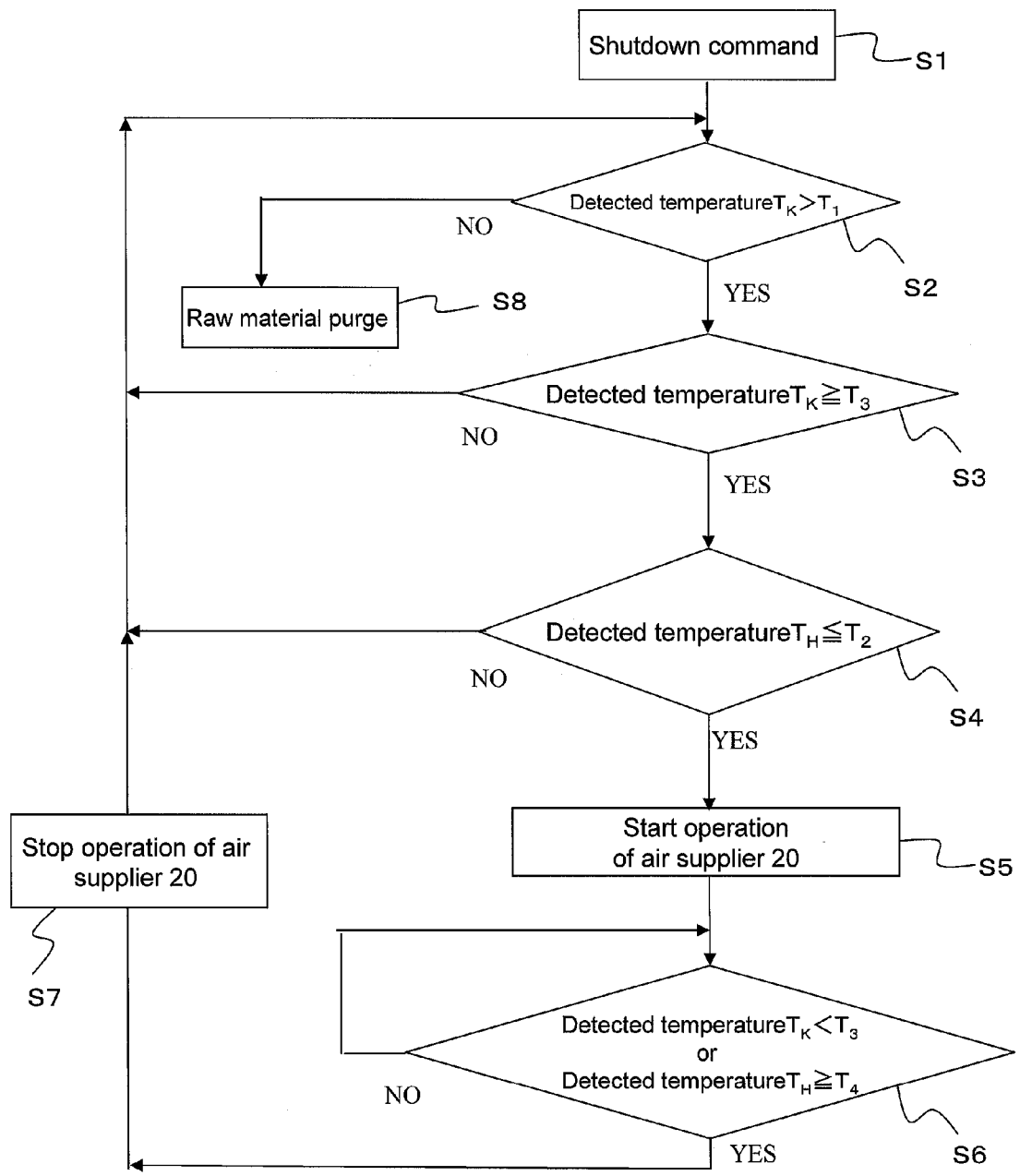
FIG. 3 is a flowchart of a method of shutting down the hydrogen generation apparatus in Embodiment 1 of the present disclosure.

FIG. 3 is a diagram showing a control flow according to the method of shutting down the hydrogen generation apparatus 1 in Embodiment 1. In FIG. 3 and other figures referred to below, each step is indicated by an abbreviated symbol S.

First, in step 1, the operation controller 13 stops the functioning of the combustor 2, the water supplier 3 and the raw material supplier 4 at a shutdown command. This step of shutting down the combustor 2 corresponds to an example of the first step in the present. At the time of shutdown commanding, a detected temperature $T_K$ sensed by the first temperature sensor 24 is, for example, about 650° C., while a detected temperature $T_H$ sensed by the second temperature sensor 25 is, for example, about 150° C.

Next, in step 2, determination is made as to whether the detected temperature $T_K$ is higher than a temperature $T_1$ set in advance. The temperature $T_1$ is a temperature at which the raw material supplier 4 is made to function to replace the gas containing hydrogen with the raw material, and at which precipitation of carbon from the raw material when the raw material is caused to flow through the reforming device 14 is limited. The temperature $T_1$ is an example of the predetermined temperature $T_1$ in the present disclosure. For example, if the reforming catalyst is a Ni catalyst, the temperature $T_1$ can be set to about 150 to 350° C.

After commanding shutdown, the temperature of the reforming device 14 decreases continuously from 650° C. Accordingly, the control proceeds to step 3 before the detected temperature $T_K$ reaches the temperature $T_1$ after commanding shutdown. When the detected temperature $T_K$ reaches the temperature $T_1$, the control proceeds to step 8 and the raw material supplier 4 functions to perform raw material purge. This step 8 corresponds to an example of the third step.

If in step 2, if the detected temperature $T_K$ is higher than the temperature $T_1$, the control proceeds to step 3 to determine whether or not the detected temperature $T_K$ is equal to or higher than a reference temperature $T_3$ set in advance. The reference temperature $T_3$ is set to a temperature higher than the temperature $T_1$. For example, the reference temperature $T_3$ can be set to 400° C. The reference temperature $T_3$ will be again described with respect to steps 5 and 6. The reference temperature $T_3$ corresponds to an example of the third temperature in the present disclosure.

Since the temperature of the reforming device 14 decreases from 650° C., the control proceeds to step 4 if the detected temperature $T_K$ is equal to or higher than $T_3$, and determines whether or not the detected temperature $T_H$ sensed by the second temperature sensor 25 is equal to or lower than a first reference temperature $T_2$ set in advance. The first reference temperature $T_2$ corresponds to an example of the first temperature in the present disclosure. The first reference temperature $T_2$ is set to a temperature at which dew condensation does not occur, and which is at least higher than the dew point of the gas in the converting device 15. Preferably, a temperature at which water vapor does not condense is considered as the first reference temperature $T_2$. The first reference temperature $T_2$ may be set to 80 to 150° C.

If in step 4 the detected temperature $T_H$ dropping naturally is equal to or lower than $T_2$, the control proceeds to step 5 to start functioning of the first air supplier 20. This is because in such a situation where the detected temperature $T_H$ is equal to or lower than the first reference temperature $T_2$, a probability of the temperature of the converting catalyst becoming lower than the gas dew point before the detected temperature $T_K$ reaches the temperature $T_1$ is assumable. In step 5, therefore, the first air supplier 20 is made to function to apply heat from the reforming device 14 to the converting device 15, as described below.

Figure 4:
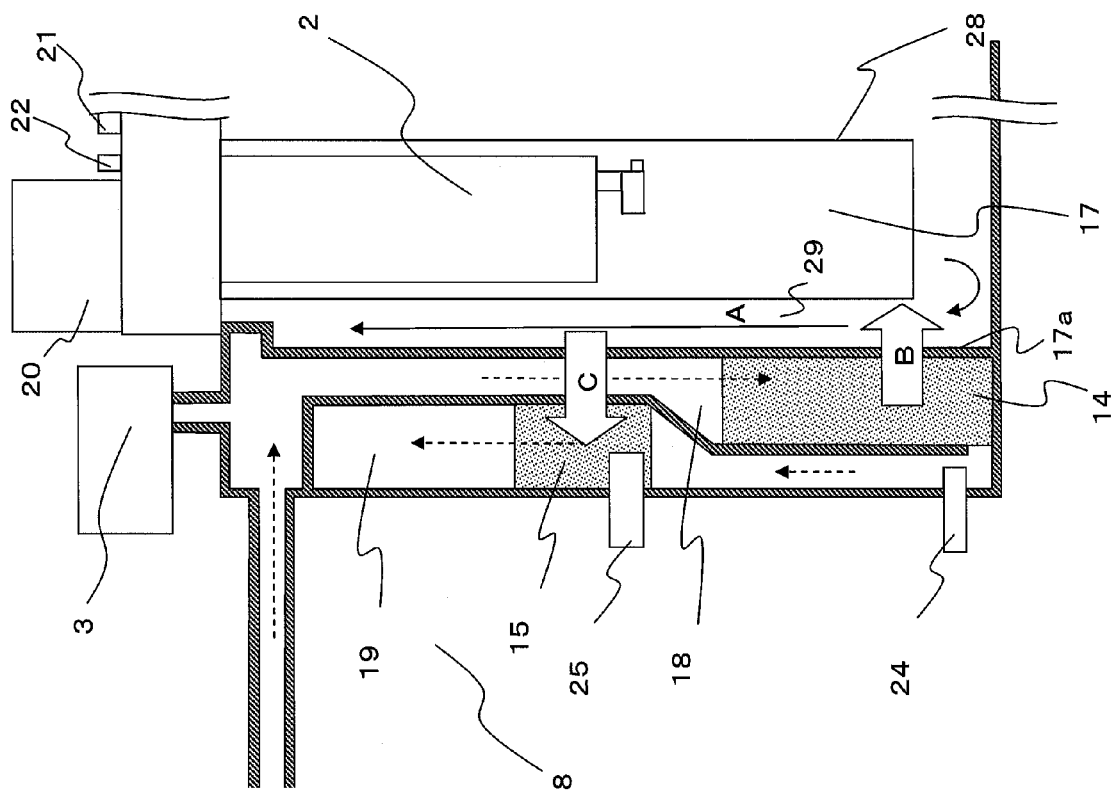
FIG. 4 is a partial sectional view of a portion of the hydrogen generator in Embodiment 1 of the present disclosure.

FIG. 4 is an enlarged diagram of a portion of the hydrogen generator 8.

Air supplied downward from the first air supplier 20 moves from below to above as indicated by arrow A. That is, the air moves through the above-described combustion exhaust gas path 29. The air absorbs heat from the reforming device 14 in a lower section of the path to increase its temperature (see arrow B). The air having the increased temperature moves upward and gives heat to the converting device 15 (see arrow C). As described above, heat from the reforming device 14 is transferred to the converting device 15 through the medium of air supplied from the first air supplier 20, thus enabling limiting of the reduction in temperature of the converting device 15.

Referring again to FIG. 3, the first air supplier 20 continues functioning until in step 6 the detected temperature $T_K$ becomes lower than the reference temperature $T_3$ or the detected temperature $T_H$ becomes equal to or higher than a second reference temperature $T_4$. When this condition is satisfied, the control proceeds to step 7 to stop functioning of the first air supplier 20. The reference temperature $T_3$ also described with respect to step 3 is set as such a temperature that when the temperature of the reforming device 14 is lower than $T_3$, a sufficiently large influence cannot be exerted on the increase in temperature of the converting device 15 while the first air supplier 20 is functioning. The second reference temperature $T_4$ is an example of the second temperature in the present disclosure. The second reference temperature $T_4$ is set to a temperature higher than the first reference temperature $T_2$. The second reference temperature $T_4$ may be set equal to the first reference temperature $T_2$. With the setting to the same temperature as the first reference temperature $T_2$, however, there is a possibility of frequently turning on/off the first air supplier 20. Therefore, the second reference temperature $T_4$ is set to such a value as to provide a hysteresis for improving the controllability. That is, it is preferable to set the second reference temperature $T_4$ to such a temperature that turning on/off of the first air supplier 20 is not frequently performed. For example, the second reference temperature $T_4$ may be set to a temperature higher by 5 to 10° C. than the first reference temperature $T_2$.

After shutdown of the first air supplier 20 in step 7, a return to step 2 is again made to repeat the same steps as those described above. The detected temperature $T_K$ only decreases from the temperature 650° C. at the time of shutdown command, as mentioned above. Therefore, once the detected temperature $T_K$ becomes lower than the reference temperature $T_3$, it does not again become higher than $T_3$. For this reason, if it is determined in step 3 or 6 that the detected temperature $T_K$ is lower than $T_3$, steps 2 and 3 are repeated. That is, the first air supplier 20 is not made to function until the detected temperature $T_K$ reaches the temperature $T_1$.

If in step 4 the detected temperature $T_H$ is higher than the first reference temperature $T_2$, the control returns to the second step by assuming that there is still no risk of dew condensation.

Thus, a process is realized in which after shutdown command in step 1 and before starting raw material purge in step 8, steps 2 to 7 are repeated as required to make the first air supplier function so that the temperature of the gas in the CO reducing device is not equal to or lower than the dew point. This group of steps corresponds to an example of the second step in the present disclosure.

In the shutdown method in the present Embodiment 1, as described above, the first air supplier 20 is made to function so that dew condensation does not occur in the converting device 15 before the temperature of the reforming device 14 reaches the temperature at which purge with the raw material is performed, and heat is transferred from the reforming device 14 at a comparatively high temperature to the converting device 15 by using air as a heat-transfer medium to keep the converting device 15 warm.

Also, since steps 5 and 7 are ordinarily repeated as described above, functioning of the first air supplier 20 is intermittently performed.

An example of the hydrogen generation apparatus 1 in the present Embodiment 1 will be described. In this example, the hydrogen generation apparatus 1 was evaluated in a single state without being incorporated in the fuel cell system.

Example 1

Functions to shut down the hydrogen generation apparatus 1 were performed by preparing a program with the temperature $T_1$ set to 320° C., the first reference temperature $T_2$ and the second reference temperature $T_4$ set to 120° C. and the reference temperature $T_3$ set to 400° C. in the control flow of the shutdown method for the hydrogen generation apparatus 1 in FIG. 3. The rate of supply of air by the first air supplier 20 was set to 5 NL/min.

Figure 5:
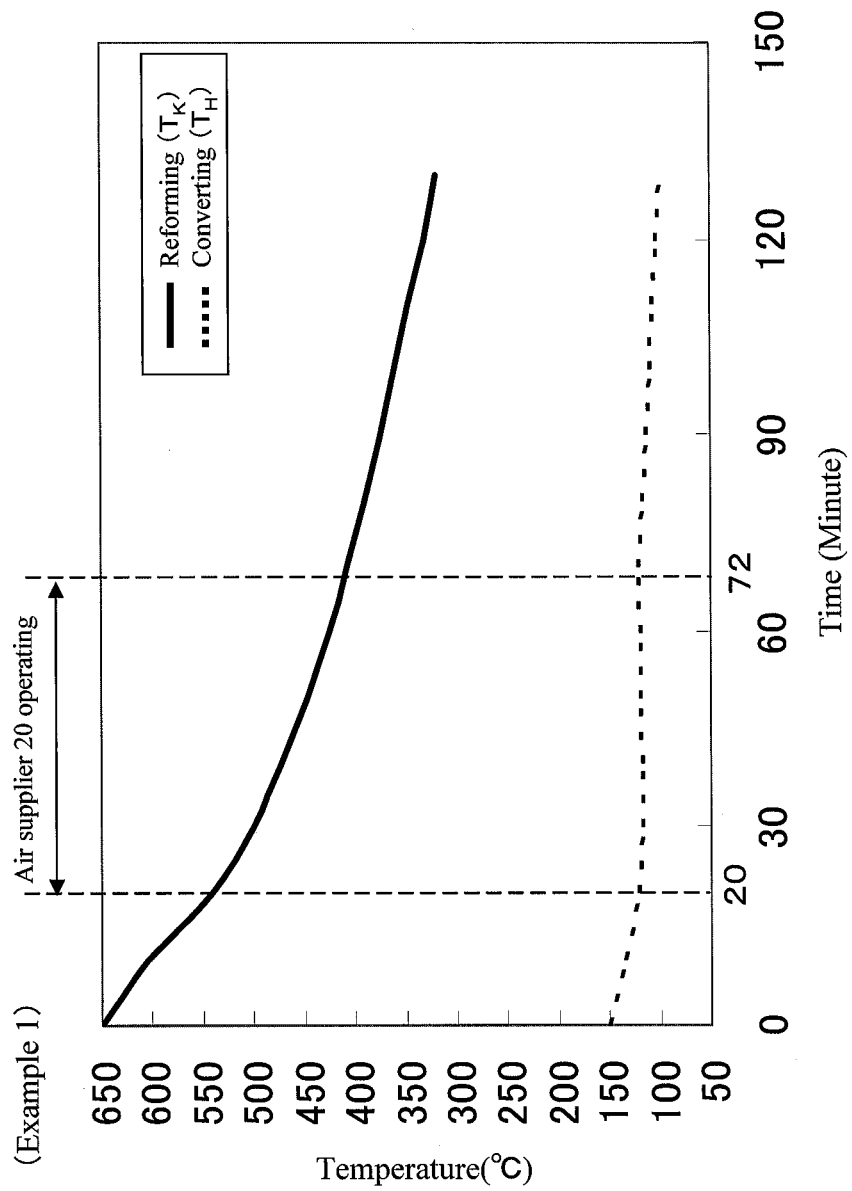
FIG. 5 is a diagram showing a graph of changes in the temperatures of a reforming device and a converting device with respect to time in Example 1 of the present disclosure.

FIG. 5 is a diagram showing a graph of changes in the detected temperature $T_K$ and the detected temperature $T_H$ with respect to time. The first air supplier 20 was made to function from a time 20 minutes after shutdown to a time 72 minutes after shutdown on the basis of the above-described flow from step 2 to step 7. When the detected temperature $T_K$ became equal to 320° C., the detected temperature $T_H$ was 99° C. Even after repeating startup and shutdown 100 times, no reductions in strength and no reductions in activity of the catalysts were recognized.

Comparative Example 1

In Comparative Example 1, shutdown functions were performed by preparing a program without using the control flow of the shutdown method described in the present Embodiment 1, such that raw material purge by means of the raw material supplier 4 was executed in Example 1 when the detected temperature $T_K$ became equal to or lower than 320° C. after shutting down the combustor 2, the water supplier 3 and the raw material supplier 4 at the shutdown command.

Figure 6:
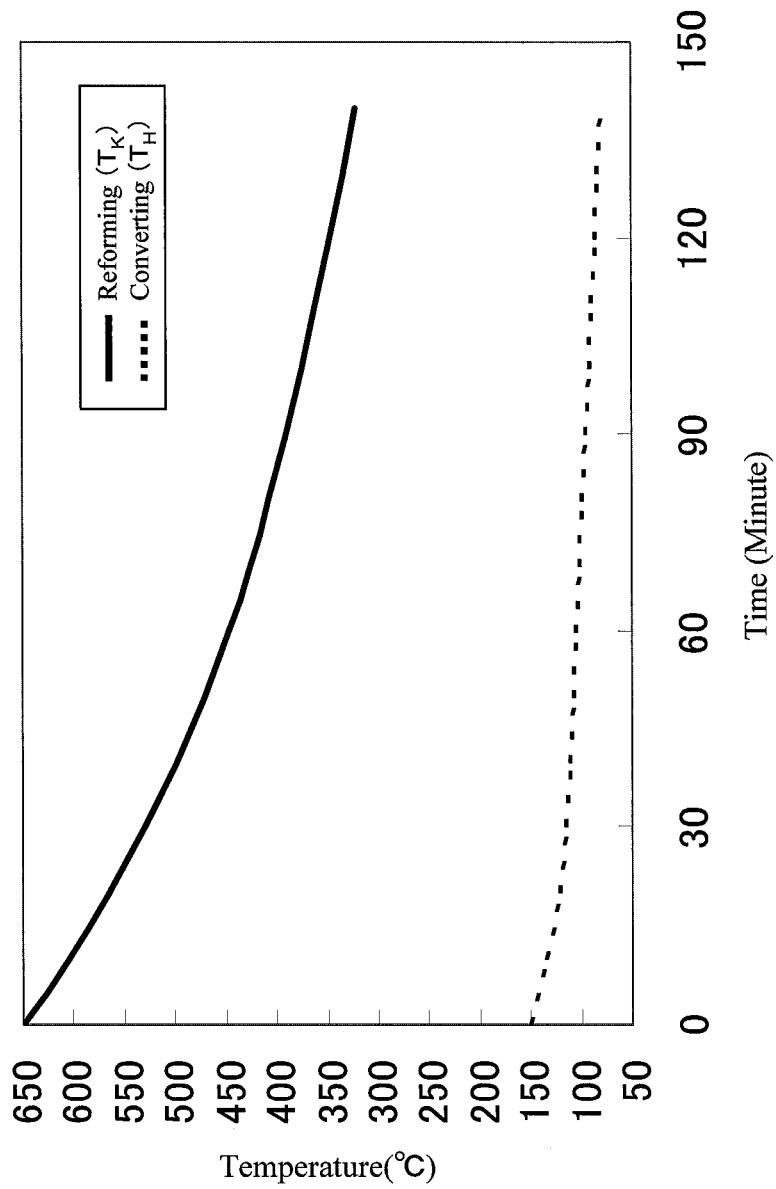
FIG. 6 is a diagram showing a graph of changes in the temperatures of the reforming device and the converting device with respect to time in Comparative Example 1.

FIG. 6 is a diagram showing a graph of changes in the detected temperature $T_K$ and the detected temperature $T_H$ with respect to time. When the detected temperature $T_K$ became equal to 320° C., the detected temperature $T_H$ was 79° C. After repeating startup and shutdown 100 times, the converting catalyst was taken out to measure its strength. The strength was reduced to 70% of the initial value. Also, the activity was reduced to 75% of the initial value.

As described above, the shutdown method for the hydrogen generation apparatus 1 in the present Embodiment 1 was recognized as advantageous in terms of limiting of dew condensation.

The catalysts in the present disclosure are not necessarily limited to those used in the present embodiment. For example, a Ru-based catalyst may be used as a reforming catalyst. However, cooling conditions vary with respect to kinds of catalyst. For example, a Ru catalyst as a reforming catalyst is widely adopted particularly in hydrogen generation apparatuses for fuel cells in home use because of, for example, its good usability relating to its low liability to receive carbon precipitation, but it is high in cost. On the other hand, the Ni catalyst used in the present Embodiment 1 can be obtained at a low cost but it is liable to receive carbon precipitation in comparison with the Ru catalyst and therefore necessitates reducing the temperature at which purge (replacement) in the apparatus using the raw material can be performed in comparison with the Ru catalyst. The upper limit temperature at which purge can be performed, varying with respect to kinds of catalyst, is about 400 to 500° C. on the Ru catalyst and is about 300 to 400° C. on the Ni catalyst.

The catalysts in the reaction sections in the hydrogen generation apparatus are different in the temperatures of use and the amounts of use depending on the configuration of the apparatus. The temperature at which dew condensation occurs also varies. Therefore, different conditions of cooling during shutdown result. Thus, the conditions of cooling in the reforming device and the converting device vary with respect to kinds of catalyst, and the conditions of reduction in temperature vary depending on the configuration of the apparatus. For this reason, suitable reference values $T_1$ to $T_4$ selected on an apparatus-by-apparatus basis are employed to enable limiting of degradation of the converting catalyst due to dew condensation.

While in the present Embodiment 1 the reference temperature $T_3$ is set to 400° C., higher than the temperature $T_1$ 320° C., the temperatures $T_3$ and $T_1$ may alternatively be set equal to each other. In the above-described embodiment, control of the first air supplier 20 is not performed when the detected temperature $T_K$ is lower than the reference temperature $T_3$. However, if setting of $T_3=T_1$ is made, control of the first air supplier 20 is performed depending on the temperature of the converting device 15 before the detected temperature $T_K$ reaches the temperature $T_1$.

In the present Embodiment 1, raw material purge is performed by making the raw material supplier 4 function when the detected value from the first temperature sensor 24, i.e., the detected temperature $T_K$, decreases to the temperature $T_1$. However, if the decreasing change in temperature of the reforming device 14 with respect to time is obtained in advance, the first temperature sensor 24 may be removed and the raw material supplier 4 may be made to function after a lapse of a predetermined time period from the time when the combustor 2 is shut down. This predetermined time period is the time period from the time when the combustor 2 is shut down to the time when the temperature of the reforming device 14 reaches the temperature suitable for raw material purge. Details of this procedure will be described below.

In the present Embodiment 1, the second reference temperature $T_4$ higher than the first reference value $T_2$ is set to provide a hysteresis for improvement in controllability. However, the temperatures $T_4$ and $T_2$ may alternatively be set equal to each other, as described above.

Further, a combination of these settings may be made to perform control during the predetermined time period after the shutdown command and before the execution of raw material purge so that the first air supplier 20 is made to function when the detected temperature $T_H$ becomes equal to or lower than the first reference temperature $T_2$, and is shut down when the detected temperature $T_H$ becomes higher than the first reference temperature $T_2$.

In the present Embodiment 1, the temperatures are directly sensed by using the first temperature sensor 24 and the second temperature sensor 25. This temperature sensing is not necessarily required. Each temperature can be detected by utilizing a physical variable having a correlation with the temperature without such a temperature sensor.

For example, the temperature can be indirectly grasped by utilizing the lapse of time from the time when the combustor 2 is shut down.

That is, data is taken under various conditions. For example, it is assumed that the time taken to reduce the temperature of the converting device 15 to the first reference temperature $T_2$ under a standard environmental condition is experimentally found to be 20 minutes from the time when the shutdown is made (see FIG. 5). That is, it can be supposed that the temperature of the converting device 15 decreases to the first reference temperature $T_2$ after a lapse of 20 minutes from the time when the shutdown is made. It is possible to measure the temperature with a timer in this way without using the second temperature sensor 25.

Also, data is assumed to be taken which indicates that the temperature of the converting device 15 reaches the second reference temperature $T_4$ after a lapse of 3 minutes from a start of functioning of the first air supplier 20 made after the above-described decrease in temperature. Various data items are also assumed to be thereafter taken according to such timing that dew condensation is avoided, while shutting down the first air supplier 20.

Further, under this condition, data is assumed to be taken which indicates that the temperature of the reforming device 14 decreases to the temperature $T_1$ after a lapse of 72 minutes from the shutdown. As a result, it is understood that raw material purge may be started after a lapse of 72 minutes from shutdown.

Thus, if the decreasing changes in temperature of the reforming device 14 and the converting device 15 with respect to time are measured in advance under various conditions, the first temperature sensor 24 and the second temperature sensor 25 may be removed and control may be performed so as to make the first air supplier 20 function by predetermined timing such that dew condensation does not occur in the converting device 15 before raw material purge is performed. In short, only limiting the reduction in temperature of the converting device 15 so as to prevent dew condensation in the converting device 15 before the temperature of the reforming device 14 at which raw material purge can be performed is reached may suffice.

"The gas temperature in the CO reducing device is equal to or lower than the dew point", "the gas temperature in the CO reducing device is equal to or lower than the first temperature", "the gas temperature in the CO reducing device is equal to or higher than the second temperature" and "the temperature of the reforming device is equal to or higher than the third temperature" in the present disclosure are defined as conditions including both a case where the gas temperature in the CO reducing device directly detected is "equal to or lower than the dew point", "equal to or lower than the first temperature", "equal to or higher than the second temperature" or "equal to or higher than the third temperature" and a case where the gas temperature in the CO reducing device indirectly detected is "equal to or lower than the dew point", "equal to or lower than the first temperature", "equal to or higher than the second temperature" or "equal to or higher than the third temperature".

Such a method not using the temperature sensors can also be applied to other embodiments described below.

Embodiment 2

A hydrogen generation apparatus and a fuel cell system having the hydrogen generation apparatus in Embodiment 2 of the present disclosure will be described below. The hydrogen generation apparatus and the fuel cell system having the hydrogen generation apparatus in the present Embodiment 2 have basically the same configuration as that in Embodiment 1. However, the configuration in the present Embodiment 2 differs from that in Embodiment 1 in that a first heater for heating the converting device 15 is provided in the hydrogen generation apparatus. Description will therefore be made mainly of this point of difference. In the present Embodiment 2, the same components as those in Embodiment 1 are indicated by the same reference characters.

Figure 7:
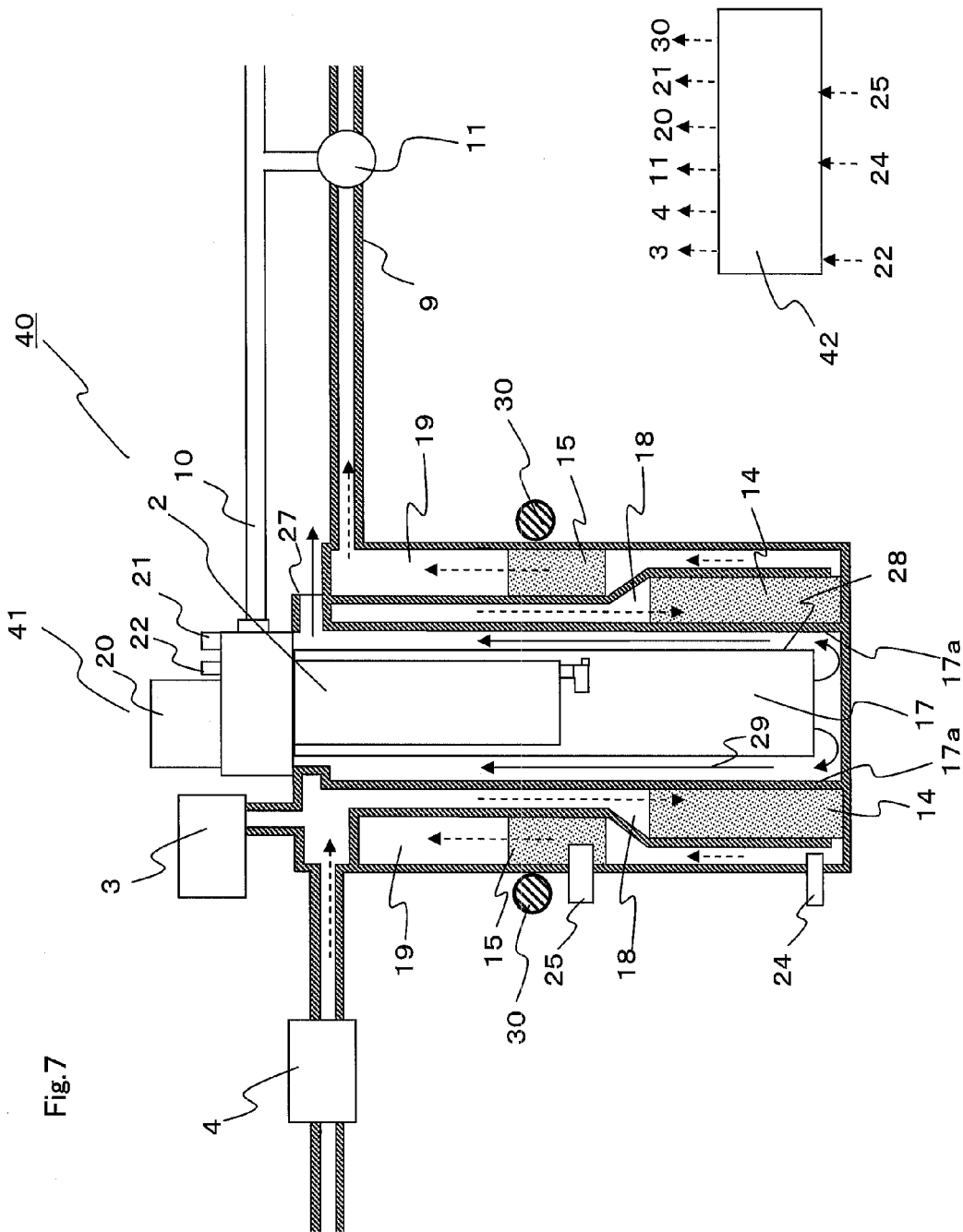
FIG. 7 is a sectional configuration diagram of a hydrogen generator in Embodiment 2 of the present disclosure.

FIG. 7 is a sectional configuration diagram of a hydrogen generator 41 of a hydrogen generation apparatus 40 in the present Embodiment 2. In contrast to the hydrogen generator 8 in Embodiment 1, the hydrogen generator 41 has a first heater 30 provided on a side surface of the converting device. The first heater 30 is a sheath heater for heating the converting device 15. The first heater 30 corresponds to an example of the heater in the present disclosure. Also, an operation controller 42 which controls the first heater 30 as well is provided in place of the operation controller 13 in Embodiment 1.

The method of shutting down the operation of the hydrogen generation apparatus and the fuel cell system having the hydrogen generation apparatus in the present Embodiment 2 will be described. Operational functioning other than that in the shutdown method is the same as that in Embodiment 1, and the description for it will not be repeated.

Figure 8:
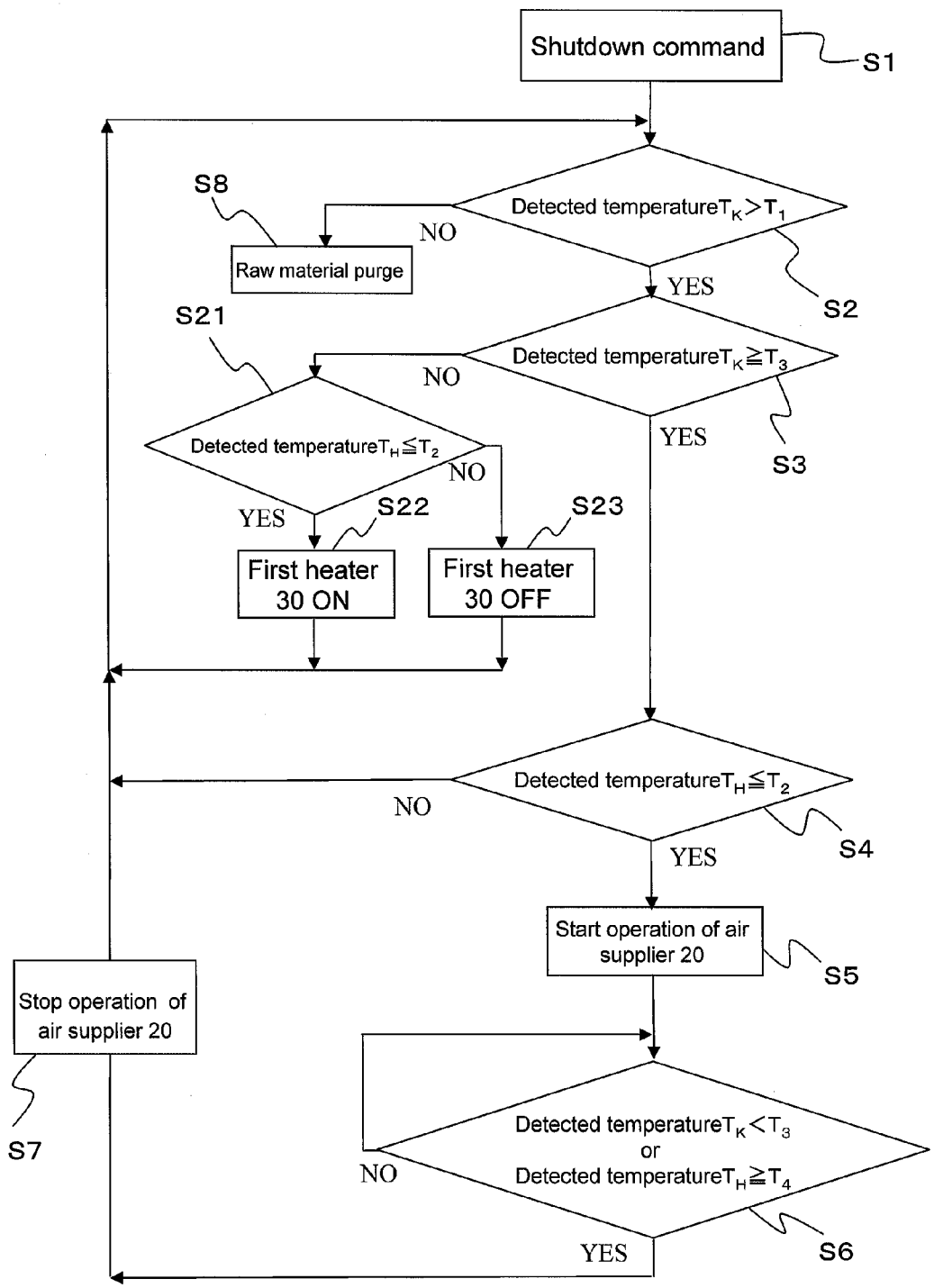
FIG. 8 is a flowchart of a method of shutting down a hydrogen generation apparatus in Embodiment 2 of the present disclosure.

FIG. 8 is a diagram showing the control flow of the method of shutting down the hydrogen generation apparatus 40 in the present Embodiment 2.

In the control flow shown in FIG. 8, the same steps as those in Embodiment 1 are indicated by the same reference characters.

Steps 1 and 2 in the control flow shown in FIG. 8 are the same as those in Embodiment 1. If in step 3 the detected temperature $T_K$ becomes lower than the reference temperature $T_3$, the control proceeds to step 21. In step 21, determination is made as to whether or not the detected temperature $T_H$ is equal to or lower than the first reference temperature $T_2$.

If the detected temperature $T_H$ is equal to or lower than the first reference temperature $T_2$, the operation controller 42 sets the first heater 30 in an on-state in step 22. If the detected temperature $T_H$ is higher than the first reference temperature $T_2$, the operation controller 42 sets the first heater 30 in an off-state in step 23. The control then proceeds to step 2 again. A mode may be adopted in which a step of maintaining the first heater 30 in the on-state until the detected temperature becomes equal to or higher than the reference temperature T4 is performed in place of the above-described step 23.

The detected temperature $T_K$ changes only in a decreasing direction after the shutdown command and does not become high, as also described in the description of Embodiment 1. Therefore, if in step 3 or 6 the detected temperature $T_K$ is lower than the reference temperature $T_3$, steps 2 and 3 are repeated.

That is, on-off control of the first heater 30 is performed after the detected temperature $T_K$ has become lower than the reference temperature $T_3$ and before the detected temperature $T_K$ reaches the temperature $T_1$.

In Embodiment 1, the converting catalyst is naturally cooled after the detected temperature $T_K$ has become lower than the reference temperature $T_3$ and before the detected temperature $T_K$ reaches the temperature $T_1$. In the present Embodiment 2, the converting catalyst is heated by the heater and, therefore, the effect of limiting the occurrence of dew condensation can be increased relative to that of the hydrogen generation apparatus in Embodiment 1.

In the case of the present Embodiment 2, the first heater 30 may be turned on when the first air supplier 20 is made to function in step 5, although this turning-on is not shown in FIG. 8. Not only the heating action through air but also the heating action through the first heater 30 is exerted thereby, thus realizing a faster rise in temperature of the converting catalyst.

In such a case, step 7 includes turning off the first heater 30 as well as stopping functioning of the first air supplier 20.

An example of the hydrogen generation apparatus 40 in the present Embodiment 2 will be described. In this example, the hydrogen generation apparatus 40 was evaluated in a single state without being incorporated in the fuel cell system.

Example 2

Functions to shut down the hydrogen generation apparatus 40 were performed by preparing a program with the temperature $T_1$ set to 280° C., the first reference temperature $T_2$ and the second reference temperature $T_4$ each set to 120° C. and the reference temperature $T_3$ set to 400° C. in the control flow of the shutdown method for the hydrogen generation apparatus 40 in FIG. 8. The output from the first heater 30 was set to 200 W, and the rate of supply of air by the first air supplier 20 was set to 5 NL/min.

Figure 9:
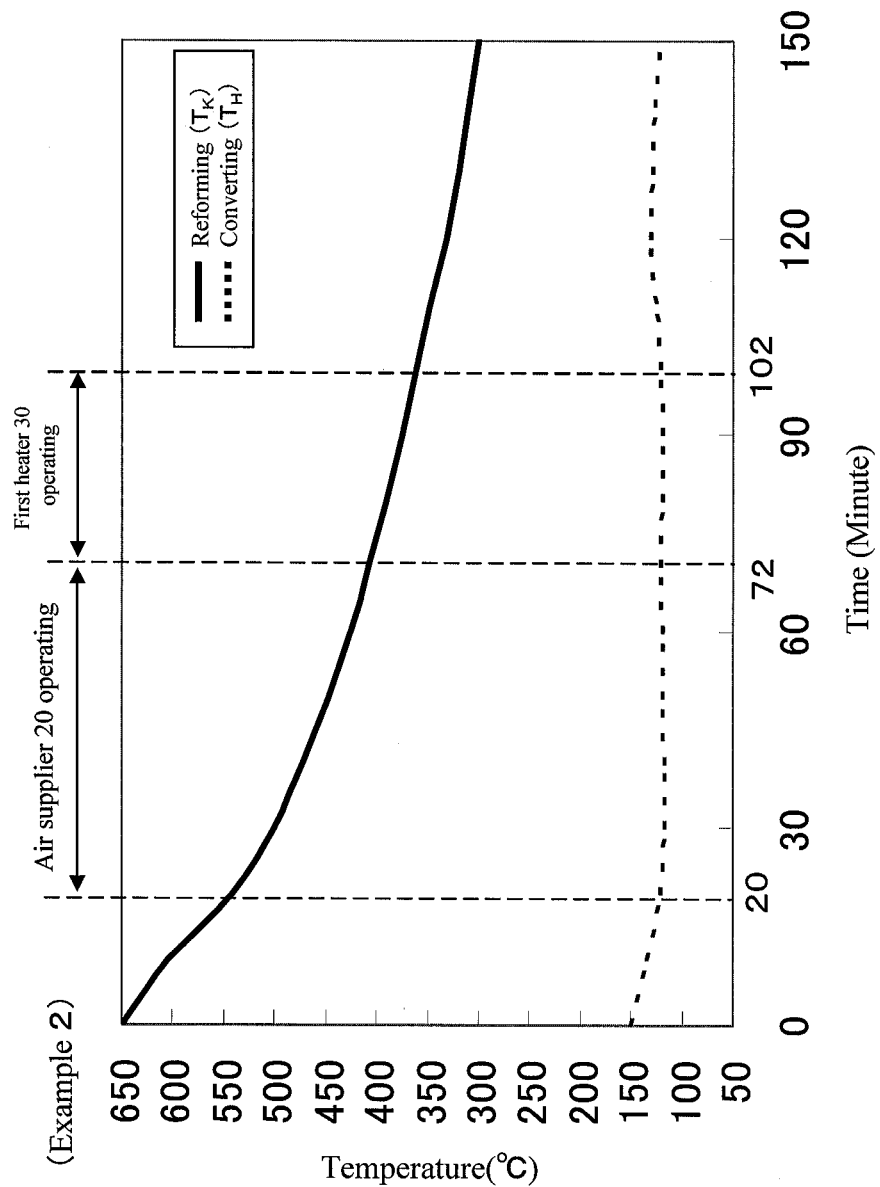
FIG. 9 is a diagram showing a graph of changes in the temperatures of the reforming device and the converting device with respect to time in Example 2.

FIG. 9 is a diagram showing a graph of changes in the detected temperature $T_K$ and the detected temperature $T_H$ with respect to time. The first air supplier 20 functioned intermittently from a time 20 minutes after shutdown to a time 72 minutes after shutdown on the basis of the flow from step 2 to step 7. The first heater 30 functioned intermittently from the time 72 minutes after shutdown to a time 102 minutes after shutdown on the basis of the flow of steps 2, 3, and 21 to 23.

The detected temperature $T_H$ increases even after functioning of the first heater 30. This is an overshoot due to low heater response.

When the detected temperature of the first temperature sensor 24 became equal to 280° C., the detected temperature of the second temperature sensor 25 was 121° C. Even after repeating startup and shutdown 100 times, no reductions in strength and no reductions in activity of the catalysts were recognized. Thus, the shutdown method for the hydrogen generation apparatus in the present Embodiment capable of limiting dew condensation by means of the combination of warm-keeping functioning based on supply of air and warm-keeping functioning with the heater was recognized as advantageous.

The power consumption in Example 2 was 105.2 Wh: combustion fan functioning (6 W×52 min) plus first heater functioning (200 W×30 min).

Comparative Example 2

In Comparative Example 2, functions to shut down the hydrogen generation apparatus were performed by using a control flow formed by removing steps 4 to 7 in the control flow shown in FIG. 8. If the detected temperature $T_K$ is equal to or higher than $T_3$ in step 3 in this comparative example, the control returns to step 2. That is, this Comparative Example 2 is an example of limiting the occurrence of dew condensation in the converting device 15 only with the first heater 30.

Figure 10:
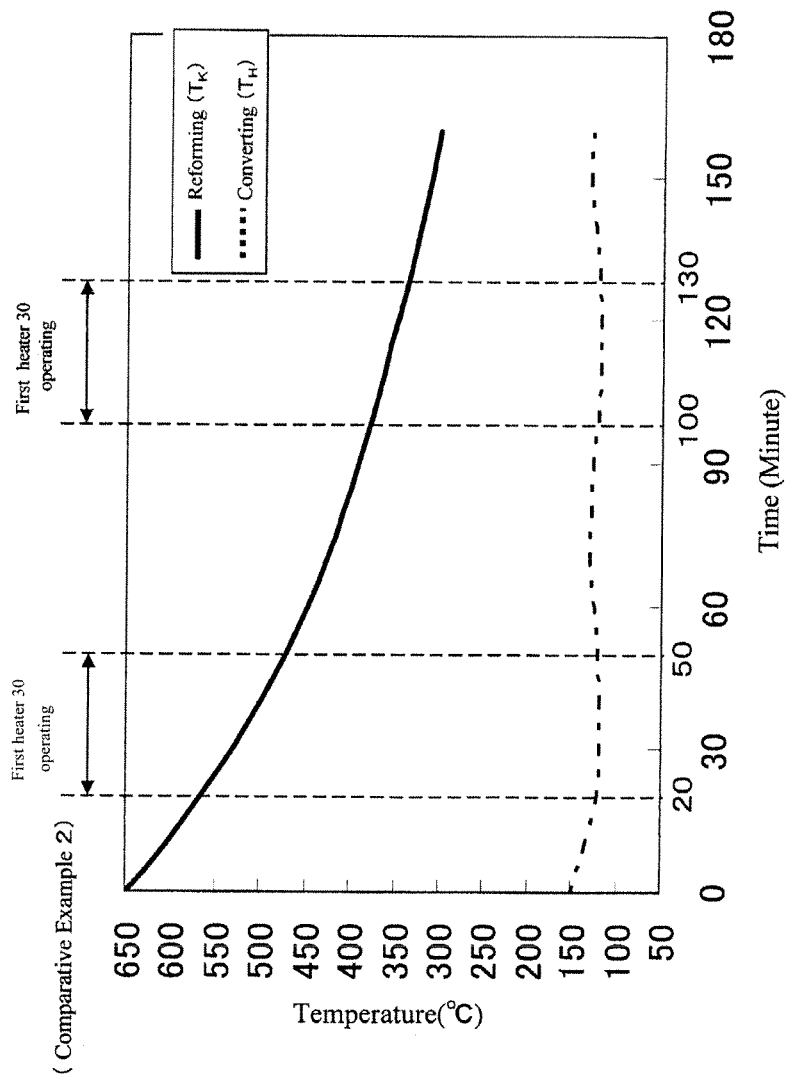
FIG. 10 is a diagram showing a graph of changes in the temperatures of the reforming device and the converting device with respect to time in Comparative Example 2.

FIG. 10 is a diagram showing a graph of changes in the detected temperature $T_K$ and the detected temperature $T_H$ with respect to time.

The first heater 30 functioned intermittently from a time 20 minutes after shutdown to a time 50 minutes after shutdown and from a time 100 minutes after shutdown to a time 130 minutes after shutdown on the basis of the flow of steps 2, 3, and 21 to 23. When the detected temperature of the first temperature sensor 24 became equal to 300° C., the detected temperature of the second temperature sensor 25 was 128° C. Even after repeating startup and shutdown 100 times, no reductions in strength and no reductions in activity of the catalysts were recognized. It was thereby understood that dew condensation was limited by warm-keeping with the heater.

The power consumption in Comparative Example 2 was 200 W. It can be understood that shutdown can be performed while limiting dew condensation with less energy in Example 2. That is, as shown in Example 2, heat from the reforming device 14 is utilized, though partially, in place of heat from the heater to limit the reduction in temperature of the converting device 15, thus reducing the power consumption.

The embodiment has been described only with respect to use of the first heater 30 at the time of operation shutdown. However, the first heater 30 may be operated at the time of startup or during ordinary operation for the purpose of increasing the temperature of the converting catalyst.

Embodiment 3

A hydrogen generation apparatus and a fuel cell system having the hydrogen generation apparatus in Embodiment 3 of the present disclosure will be described below. The hydrogen generation apparatus and the fuel cell system having the hydrogen generation apparatus in the present Embodiment 3 have basically the same configuration as that in Embodiment 1. However, the configuration in the present Embodiment 3 differs from that in Embodiment 1 in that a CO oxidizing device is provided in the hydrogen generation apparatus. Description will therefore be made mainly of this point of difference. In the present Embodiment 3, the same components as those in Embodiment 1 are indicated by the same reference characters.

Figure 11:
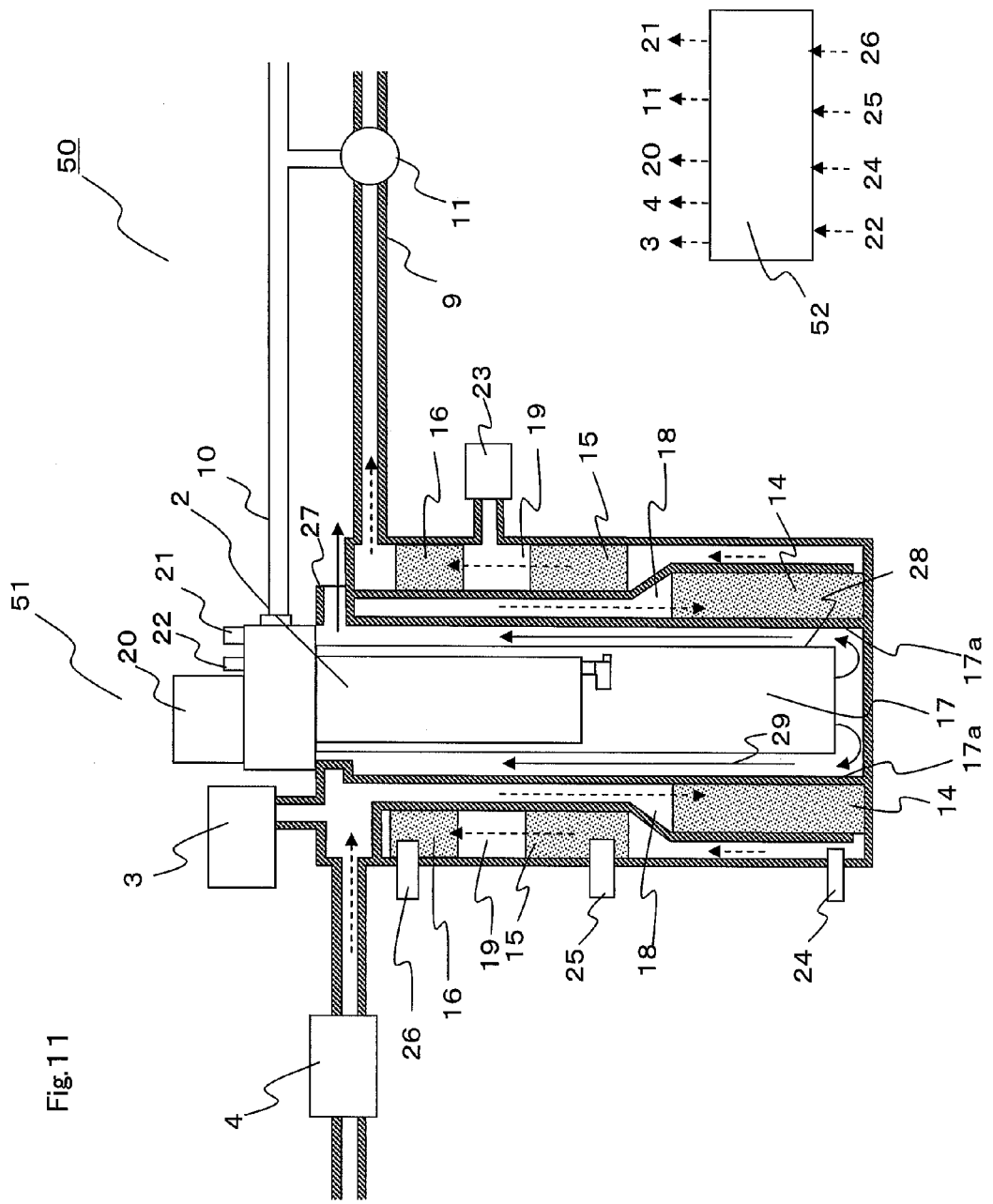
FIG. 11 is a sectional view of the construction of a hydrogen generator in Embodiment 3 of the present disclosure.

FIG. 11 is a sectional configuration diagram of a hydrogen generator 51 of a hydrogen generation apparatus 50 in the present Embodiment 3. In contrast to the hydrogen generator 8 in Embodiment 1, the hydrogen generator 51 has a CO oxidizing device 16 which mostly oxidizes and reduces carbon monoxide remaining in the gas containing hydrogen after passing through the converting device 15.

As shown in FIG. 11, a Ru-based CO oxidizing catalyst is packed in the second annular space 19 on the downstream side of the converting device 15 to constitute the CO oxidizing device 16. On the hydrogen generator 51, a second air supplier 23 is provided which supplies air to be used for oxidation to the gas containing hydrogen downstream of the converting device 15. A third temperature sensor 26 for detecting the temperature of the CO oxidizing device 16 is also provided. Further, an operation controller 52 to which a detected temperature $T_S$ from the third temperature sensor 26 is also input is provided in place of the operation controller 13 in Embodiment 1. As the third temperature sensor 26, a thermocouple, a thermistor or the like can be used.

The method of shutting down the operation of the hydrogen generation apparatus and the fuel cell system having the hydrogen generation apparatus in the present Embodiment 3 will be described. Operational functioning other than that in the shutdown method is the same as that in Embodiment 1, and the description for it will not be repeated.

Figure 12:
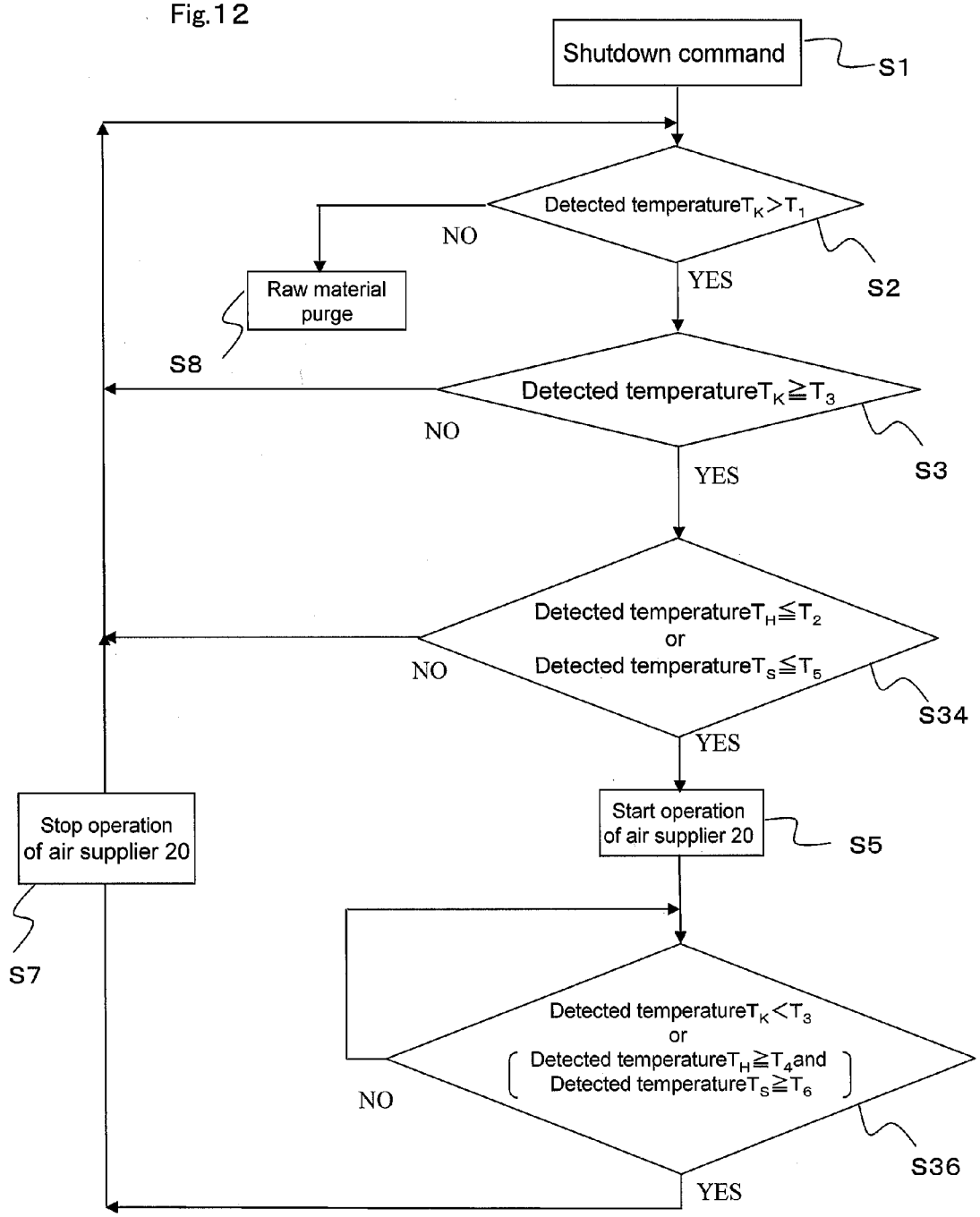
FIG. 12 is a flowchart of a method of shutting down a hydrogen generation apparatus in Embodiment 3 of the present disclosure.

FIG. 12 is a diagram showing the control flow of the method of shutting down the hydrogen generation apparatus 50 in the present Embodiment 3. The control flow shown in FIG. 12 includes steps corresponding to but different from steps 4 and 6 in the control flow in Embodiment 1. The other steps in the control flow shown in FIG. 12 are the same as those in Embodiment 1 and are indicated by the same reference characters.

In the control flow in the present Embodiment 3, as shown in FIG. 12, functioning of the first air supplier 20 is controlled by considering the temperature of the CO oxidizing catalyst as well as the temperature of the converting catalyst.

More specifically, if in step 3 the detected temperature $T_K$ is equal to or higher than $T_3$, the control proceeds to step 34. In step 34, determination is made as to whether or not the detected temperature $T_H$ is equal to or lower than the first reference temperature $T_2$ or whether or not the detected temperature $T_S$ is equal to or lower than a first reference temperature $T_5$. The first reference temperature $T_5$ is a temperature at which dew condensation does not occur in the CO oxidizing device 16. The first reference temperature $T_5$ is set at least higher than the dew point of the gas in the CO oxidizing device 16. The first reference temperature $T_5$ is an example of the first temperature in the present disclosure set with respect to the gas temperature in the CO oxidizing device 16. The first reference temperature $T_5$ may be set, for example, to the same temperature 120° C. as the first reference temperature $T_2$.

In short, if it is determined in step 34 that at least one of the temperature of the converting device 15 and the CO oxidizing device 16 is lower than the reference temperature, the control proceeds to step S5 to cause the first air supplier 20 start functioning. By the functioning of the air supplier 20, heat from the reforming device 14 is transferred to the converting device 15 and to the CO oxidizing device 16 through the medium of air, thereby limiting the reductions in the temperatures of the converting device 15 and the CO oxidizing device 16.

The control then proceeds to step 36 to stop functioning of the first air supplier 20 if the detected temperature $T_K$ is lower than the reference temperature $T_3$, or if the detected temperature $T_H$ is equal to or higher than the second reference temperature $T_4$ and the detected temperature $T_S$ is equal to or higher than a second reference temperature $T_6$.

In this step 36, the first air supplier 20 is shut down if the temperature of the reforming device 14 becomes lower than the temperature $T_3$ at which a sufficiently large influence cannot be exerted on the temperatures of the converting device 15 and the CO oxidizing device 16, as in the case of Embodiment 1. Further, if each of the detected temperature $T_H$ and the detected temperature $T_S$ becomes equal to or higher than the second reference temperature, functioning of the first air supplier 20 is also stopped by assuming that there is no risk of dew condensation. The second reference temperature $T_6$ is an example of the predetermined temperature $T_6$ in the present disclosure set with respect to the gas temperature in the CO oxidizing device 16. The second reference temperature $T_6$ is set equal to or higher than the first reference temperature $T_5$. The second reference temperature $T_6$ may be set equal to the first reference temperature $T_5$. With the setting to the same temperature as the first reference temperature $T_5$, however, there is a possibility of frequently turning on/off the first air supplier 20. Therefore, the second reference temperature $T_6$ is set to a temperature higher than the first reference temperature $T_5$ so as to provide a hysteresis for the purpose of improving the controllability. That is, it is preferable to set the second reference temperature $T_6$ to such a temperature that turning on/off of the first air supplier 20 is not frequently performed. For example, the second reference temperature $T_6$ may be set to a temperature higher by 5 to 10° C. than the first reference temperature $T_5$.

Thus, in the method of shutting down the hydrogen generation apparatus in the present Embodiment 3, functioning of the first air supplier 20 is controlled by considering the temperature of the CO oxidizing device as well, in contrast to Embodiment 1.

An example of the hydrogen generation apparatus 50 in the present Embodiment 3 will be described. In this example, the hydrogen generation apparatus 50 was evaluated in a single state without being incorporated in the fuel cell system.

Example 3

In Example 3, an experiment was made by using the hydrogen generation apparatus 50 having the configuration described in the above-described embodiment.

Functions to shut down the hydrogen generation apparatus 50 were performed by preparing a program with the temperature $T_1$ set to 320° C., the first reference temperature $T_2$, the second reference temperature $T_4$, the first reference temperature $T_5$ and the second reference temperature $T_6$ set to 120° C. and the reference temperature $T_3$ set to 400° C. in the control flow of the shutdown method for the hydrogen generation apparatus 50 in FIG. 12. The rate of supply of air by the first air supplier 20 was set to 5 NL/min.

Figure 13:
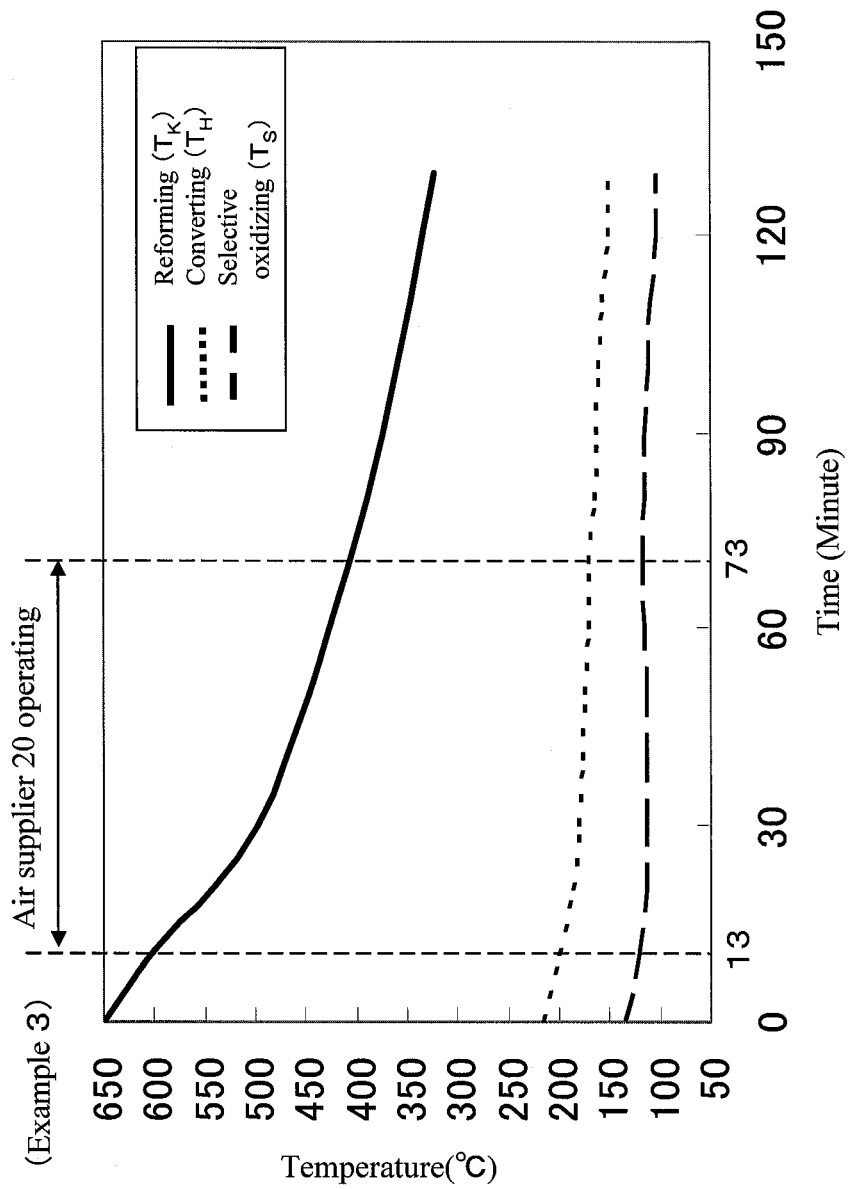
FIG. 13 is a diagram showing a graph of changes in the temperatures of a reforming device, a converting device and a CO oxidizing device with respect to time in Example 3 of the present disclosure.

FIG. 13 is a diagram showing a graph of changes in the detected temperature $T_K$, the detected temperature $T_H$ and the detected temperature $T_S$ with respect to time.

The first air supplier 20 intermittently executed functioning from a time 13 minutes after shutdown to a time 73 minutes after shutdown on the basis of the flow from step S2 to step S7. When the detected temperature $T_K$ became equal to 320° C., the detected temperature $T_S$ was 103° C. Even after repeating startup and shutdown 100 times, no reductions in strength and no reductions in activity were recognized. The shutdown method enabling prevention of dew condensation was thus recognized as advantageous.

Comparative Example 3

In Comparative Example 3, shutdown functions were performed by preparing a program without using the control flow of the shutdown method described in the present Embodiment 3, such that the reforming device 14, the converting device 15 and the CO oxidizing device 16 were naturally cooled after shutting down the combustor 2, the water supplier 3 and the raw material supplier 4 at the shutdown command, and raw material purge was executed by making the raw material supplier 4 function when the detected temperature $T_K$ became equal to 320° C.

Figure 14:
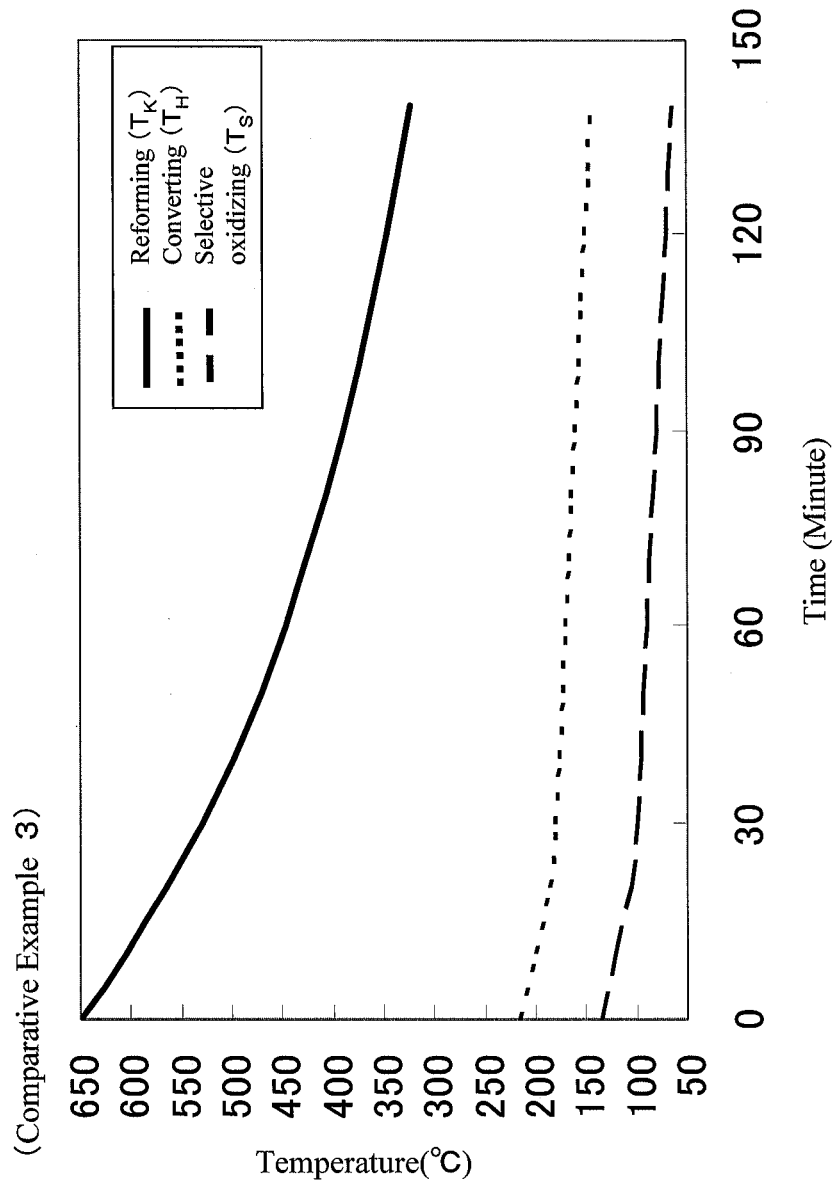
FIG. 14 is a diagram showing a graph of changes in the temperatures of the reforming device, the converting device and the CO oxidizing device with respect to time in Comparative Example 3.

FIG. 14 is a diagram showing a graph of changes in the detected temperature $T_K$, the detected temperature $T_H$ and the detected temperature $T_S$ with respect to time. When the detected temperature $T_K$ became equal to 320° C., the detected temperature $T_S$ was 64° C. After repeating startup and shutdown 100 times, the CO oxidizing catalyst was taken out to measure its activity. The activity was reduced to 70% of the initial value.

As described above, the shutdown method for the hydrogen generation apparatus 50 in the present Embodiment 3 was recognized as advantageous in terms of limiting of dew condensation.

In the above-described Embodiments 1 and 2, in contrast to the present Embodiment 3, the CO oxidizing device 16 is not provided. The reason for not providing the CO oxidizing device 16 is that in some cases the concentration required of carbon monoxide in the gas containing hydrogen produced in the hydrogen generation apparatus 1 is not so low, depending on the performance of the fuel cell. In such a case, it is not necessarily required that the CO oxidizing device 16 be provided in the hydrogen generation apparatus 1. More specifically, in a case where the hydrogen generation apparatus 1 is used by being connected to a solid-oxide fuel cell, a phosphoric acid fuel cell or the like having high CO resistance, it is not necessary to provide the CO oxidizing device 16. On the other hand, the CO oxidizing device 16 is provided in the hydrogen generation apparatus 50 in the present Embodiment 3, enabling use of a fuel cell having lower resistance to carbon monoxide (CO) in comparison with the fuel cell 100 used in Embodiment 1. In a case where the CO concentration is reduced by methanization instead of oxidation, a CO methanizing device is provided in place of the CO oxidizing device. In this case, there is no need to supply air for oxidation and, hence, no need to provide the second air supplier 23 or the like.

The above-described converting device and CO oxidizing device or CO methanizing device correspond to an example of the CO reducing device in the present disclosure.

The temperature $T_1$, the first reference temperature $T_2$, the reference temperature $T_3$, the second reference temperature $T_4$, the first reference temperature $T_5$ and the second reference temperature $T_6$ set in the above-described shutdown flow may be determined according to the characteristics of the catalysts used in the reforming device 14, the converting device 15 and the CO oxidizing device 16 and the water vapor condensation temperature, and are not limited to the values described in the present embodiment. For example, from consideration of carbon precipitation from the raw material gas on the reforming catalyst, it is preferable that the temperature $T_1$ be a temperature at which carbon precipitation from the raw material gas is limited. With respect to the Ni catalyst, such a temperature is about 150 to 350° C. As the first reference temperature $T_2$ and the first reference temperature $T_5$, a temperature at which water vapor does not condense is preferably considered. Such a temperature is 80 to 150° C.

With the configuration of the hydrogen generation apparatus 50 in the present Embodiment 3, there is a risk of dew condensation occurring faster in the CO oxidizing device 16 than in the converting device 15 at the time of shutdown, for example, as shown by the data on Example 3, because the temperature of the CO oxidizing device 16 during operation is ordinarily lower than that of the converting device 15. On the other hand, at the time of supply of the raw material, the converting device 15 is at about 150° C., as described in Example 3. It is understood that the temperature at which caution against dew condensation should be exercised is not reached at the time of supply of the raw material. Therefore, control of the first air supplier 20 may be performed by considering only the reduction in temperature of the CO oxidizing device 16 detected with the third temperature sensor 26. In such a case, the second temperature sensor 25 may be removed.

Figure 15:
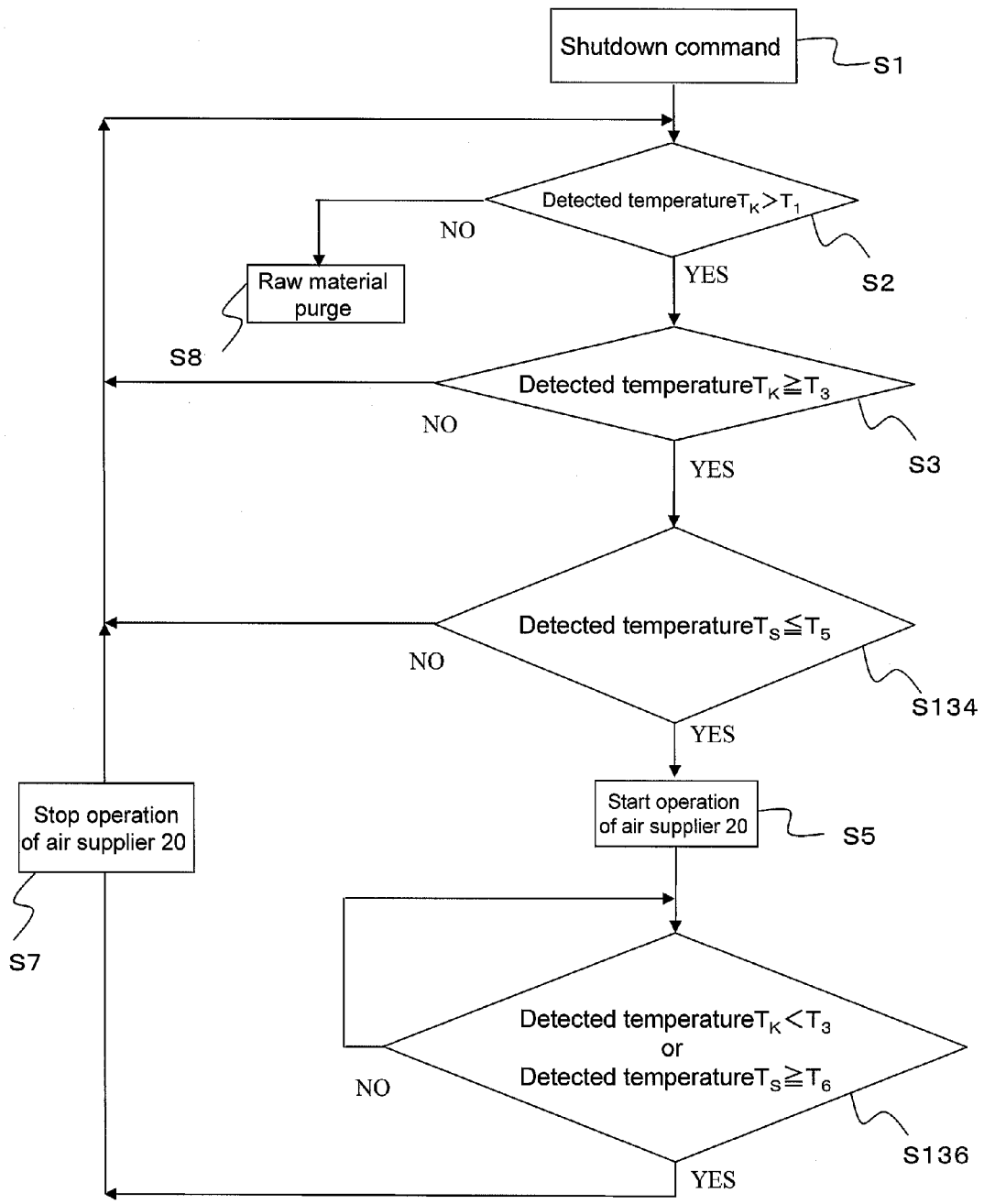
FIG. 15 is a flowchart of a method of shutting down a hydrogen generation apparatus in a modified example of Embodiment 3 of the present disclosure.

FIG. 15 is a flowchart in a case where control of the first air supplier 20 is performed by considering only the reduction in temperature of the CO oxidizing device 16 detected with the third temperature sensor 26 as described above. In the flow shown in FIG. 15, step 34 in FIG. 12 is replaced with step 134 in which determination is made only as to whether or not the detected temperature $T_S$ is equal to or lower than the first reference temperature $T_5$. Also, step 36 in FIG. 12 is replaced with step 136 in which determination is made as to whether or not the detected temperature $T_K$ is lower than the first reference temperature $T_3$ or whether or not the detected temperature $T_S$ is equal to or higher than the second reference temperature $T_6$.

Functioning of the first air supplier 20 may be controlled by sensing only the temperature of the CO oxidizing device 16 in the above-described way. In some instances, however, the temperature on the downstream side of the converting device 15 and the temperature on the upstream side of the CO oxidizing device 16 are considerably close to each other, depending on the configuration of the hydrogen generator. Therefore, control of the first air supplier 20 by sensing both the temperature of the converting device 15 and the CO oxidizing device 16 as in the present Embodiment 3 is more preferable.

In the above-described example, the reference temperatures for the converting device 15 and the CO oxidizing device 16 are set equal to each other. However, the reference temperatures may alternatively be set different from each other according to the gas dew points therein.

Also, the first temperature sensor 24 and the second temperature sensor 25 may be removed and the first air supplier 20 may be made to function on the basis of a lapse of time after shutdown of the combustor 2, as described above in Embodiment 1.

In the present Embodiment 3, the second reference temperature $T_6$ higher than the first reference temperature $T_5$ is set to provide a hysteresis for the purpose of improving the controllability. However, the temperatures $T_6$ and $T_5$ may alternatively be set equal to each other. The first reference temperature $T_2$ and the second reference temperature $T_4$ may be set in the same way.

Further, a combination of these settings may be made to perform control after the shutdown command and before the execution of raw material purge so that the first air supplier 20 is made to function when the detected temperature $T_H$ becomes equal to or lower than the first reference temperature $T_2$ or the detected temperature $T_S$ becomes equal to or lower than the first reference temperature $T_5$, and is shut down when the detected temperature $T_H$ becomes higher than the first reference temperature $T_2$ and the detected temperature $T_S$ becomes equal to or higher than the first reference temperature $T_5$.

Also, if the decreasing changes in temperature of the reforming device 14, the converting device 15 and the CO oxidizing device 16 with respect to time are measured in advance, the first temperature sensor 24, the second temperature sensor 25 and the third temperature sensor 26 may be removed and control may be performed so as to make the first air supplier 20 function by predetermined timing such that dew condensation does not occur in the converting device 15 and in the CO oxidizing device 16 before raw material purge is performed. In short, only limiting the reduction in temperature of the converting device 15 so as to prevent dew condensation in the converting device 15 and in the CO oxidizing device 16 before the temperature of the reforming device 14 at which raw material purge can be performed is reached may suffice.

In the present Embodiment 3, functioning of the first air supplier 20 is stopped if the condition in step 36 is satisfied after a start of functioning of the first air supplier 20. The first air supplier 20 may alternatively be made to continue functioning without being shut down before raw material purge is performed. From the viewpoint of energy saving, however, it is more preferable to shut down the first air supplier 20 after the temperature of the converting device 15 has increased.

Embodiment 4

A hydrogen generation apparatus and a fuel cell system having the hydrogen generation apparatus in Embodiment 4 of the present disclosure will be described below. The fuel cell system in the present Embodiment 4 have basically the same configuration as that in Embodiment 3. However, the configuration in the present Embodiment 4 differs from that in Embodiment 3 in that a first heater for heating the converting device 15 and a second heater for heating the CO oxidizing device 16 are provided in the hydrogen generation apparatus. Description will therefore be made mainly of this point of difference. In the present Embodiment 4, the same components as those in Embodiment 3 are indicated by the same reference characters.

Figure 16:
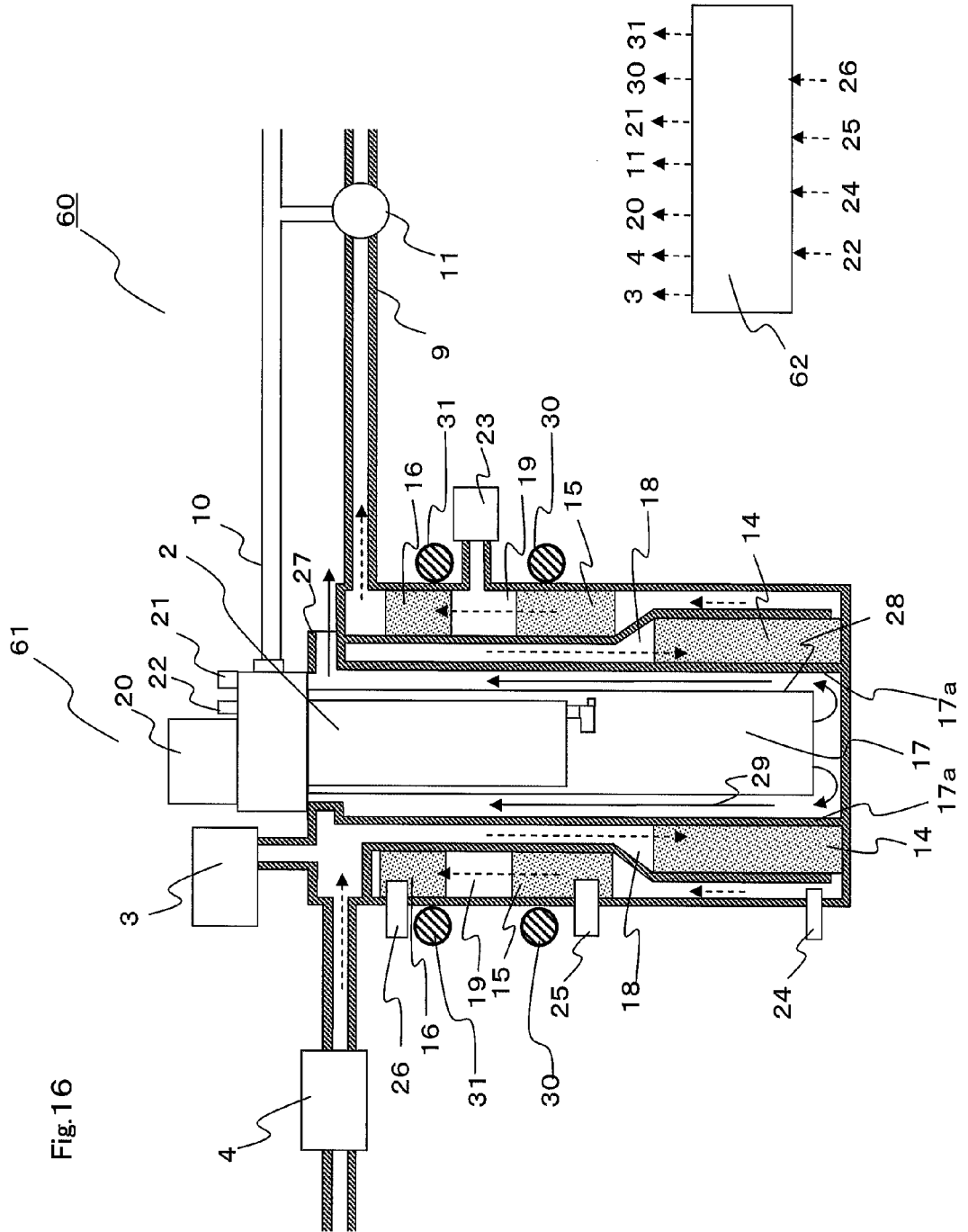
FIG. 16 is a sectional view of the construction of a hydrogen generator in Embodiment 4 of the present disclosure.

FIG. 16 is a sectional configuration diagram of a hydrogen generator 61 of a hydrogen generation apparatus 60 in the present Embodiment 4. In contrast to the hydrogen generator 51 in Embodiment 3, the hydrogen generator 61 has a first heater 30 provided on a side surface of the converting device 15. The first heater 30 is a sheath heater for heating the converting device 15. The hydrogen generator 61 also has a second heater 31 provided on a side surface of the CO oxidizing device 16. The second heater 31 is a sheath heater for heating the CO oxidizing device 16. The second heater 31 corresponds to an example of the heater in the present disclosure provided on the CO oxidizing device. An operation controller 62 which controls the first heater 30 and the second heater 31 as well is provided in place of the operation controller 52 in Embodiment 3.

The method of shutting down the operation of the hydrogen generation apparatus and the fuel cell system having the hydrogen generation apparatus in the present Embodiment 4 will be described. Operational functioning other than that in the shutdown method is the same as that in Embodiment 3, and the description for it will not be repeated.

Figure 17:
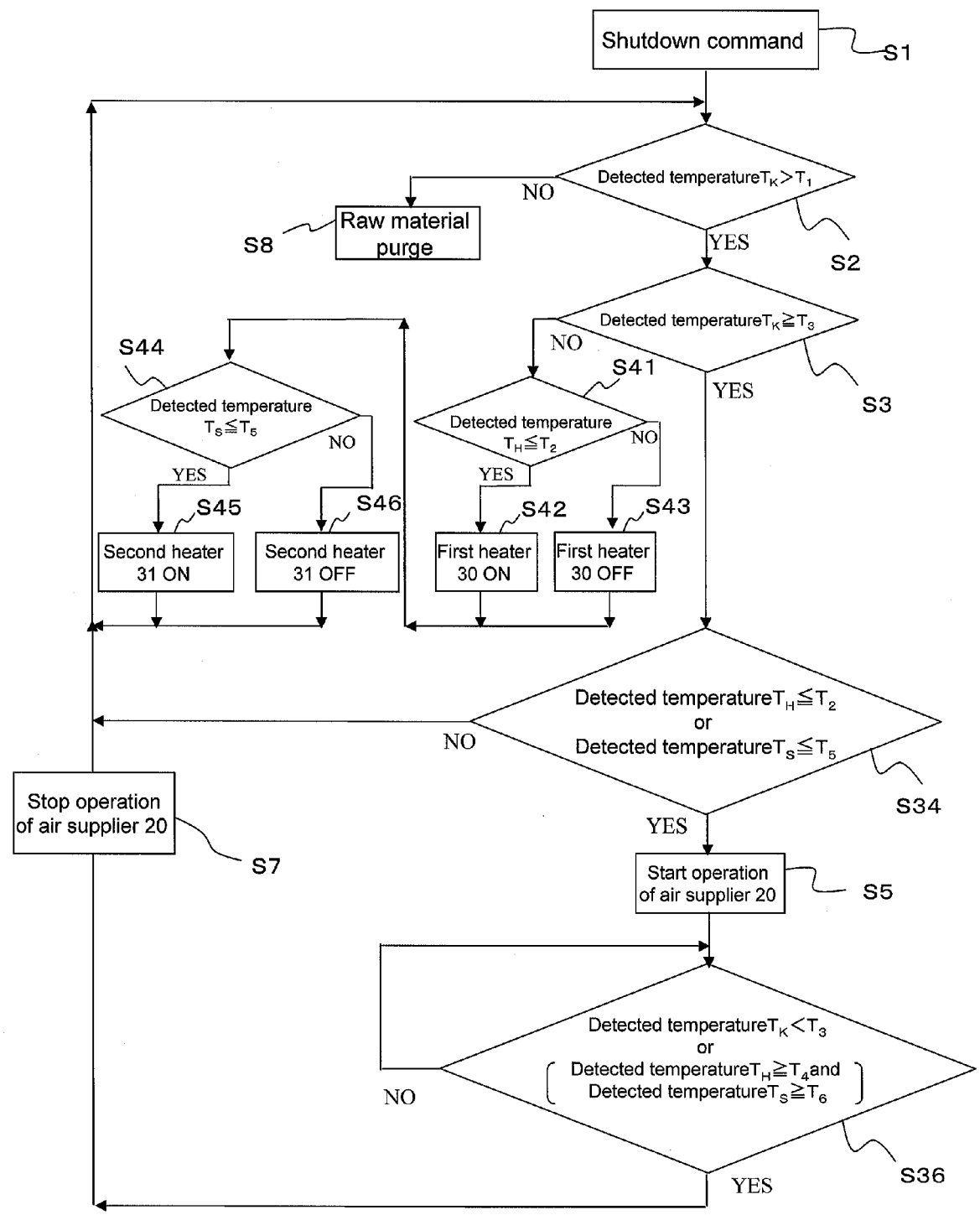
FIG. 17 is a flowchart of a method of shutting down a hydrogen generation apparatus in Embodiment 4 of the present disclosure.

FIG. 17 is a diagram showing the control flow of the method of shutting down the hydrogen generation apparatus 60 in the present Embodiment 4. The control flow shown in FIG. 17 includes steps 41 to 46 in which the control proceeds in the case where the result of determination in step 3 is NO, in addition to the control flow in Embodiment 3. The same steps as those in Embodiment 3 are indicated by the same reference characters.

As shown in FIG. 17, if in step 3 the detected temperature $T_K$ becomes lower than the reference temperature $T_3$, the control proceeds to step 41. In step 41, determination is made as to whether or not the detected temperature $T_H$ is equal to or lower than the first reference temperature $T_2$.

If in step 41 the detected temperature $T_H$ is equal to or lower than the first reference temperature $T_2$, the control proceeds to step 42 and the operation controller 62 sets the first heater 30 in the on-state. If the detected temperature $T_H$ is higher than the first reference temperature $T_2$, the control proceeds to step 43 and the operation controller 62 sets the first heater 30 in the off-state.

Subsequently, in step 44, determination is made as to whether or not the detected temperature $T_S$ is lower than the first reference temperature $T_5$.

If the detected temperature $T_S$ is equal to lower than the first reference temperature $T_5$, the control proceeds to step 45 and the operation controller 62 sets the second heater 31 in the on-state. If the detected temperature $T_S$ is higher than the first reference temperature $T_5$, the control proceeds to step 46 and the operation controller 62 sets the second heater 31 in the off-state.

The detected temperature $T_K$ does not become high after the shutdown command. Therefore, once the detected temperature $T_K$ becomes lower than the reference temperature $T_3$ in step 3 or 6, the loop of steps 2, 3, and 41 to 46 is repeated until the detected temperature $T_K$ reaches the temperature $T_1$, thus performing temperature control with the heaters and more reliably limiting the occurrence of dew condensation in the converting device 15 and the CO oxidizing device 16.

An example of the hydrogen generation apparatus 60 in the present Embodiment 4 will be described. In this example, the hydrogen generation apparatus 60 was evaluated in a single state without being incorporated in the fuel cell system.

Example 4

Functions to shut down the hydrogen generation apparatus 60 were performed by preparing a program with the temperature $T_1$ set to 280° C., the first reference temperature $T_2$, the second reference temperature $T_4$, the first reference temperature $T_5$ and the second reference temperature $T_6$ each set to 120° C. and the reference temperature $T_3$ set to 400° C. in the control flow of the shutdown method for the hydrogen generation apparatus 60 in FIG. 17. On-off control was performed by controlling the voltage so that the first heater 30 heating the converting device 15 had a capacity of 180 W and the second heater 31 heating the CO oxidizing device 16 had a capacity of 80 W. Also, the rate of supply of air by the first air supplier 20 was set to 5 NL/min.

Figure 18:
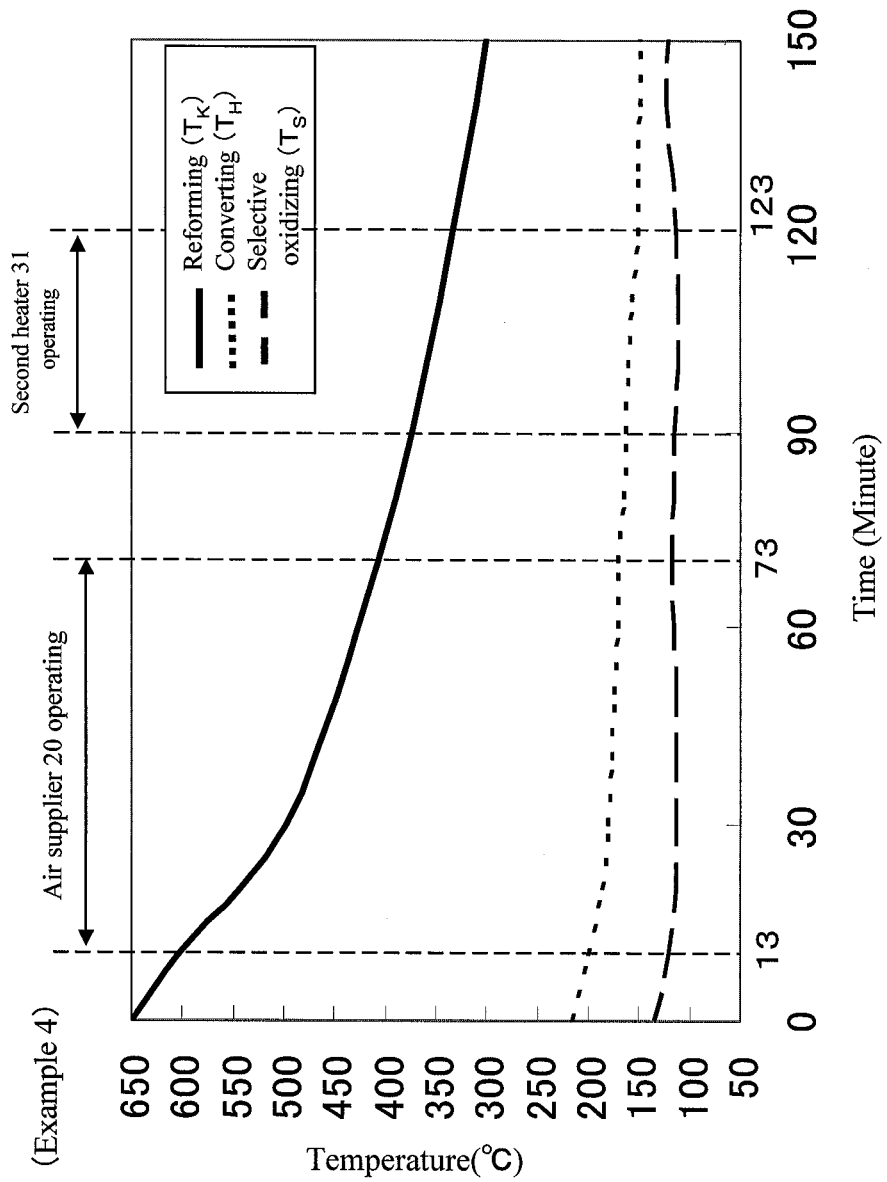
FIG. 18 is a diagram showing a graph of changes in the temperatures of a reforming device, a converting device and a CO oxidizing device with respect to time in Example 4 of the present disclosure.

FIG. 18 is a diagram showing a graph of changes in the detected temperature $T_K$, the detected temperature $T_H$ and the detected temperature $T_S$ with respect to time.

The first air supplier 20 intermittently executed functioning from a time 13 minutes after shutdown to a time 73 minutes after shutdown on the basis of the flow of steps 2, 3, 34, 5, 36, and 7. The first heater 30 did not function. The second heater 31 functioned intermittently for 33 minutes from a time 90 minutes after shutdown to a time 123 minutes after shutdown on the basis of steps 2, 3, 51, 52, and 53.

As a result, when the detected temperature $T_K$ became equal to 300° C., the detected temperature $T_S$ was 119° C. Even after repeating startup and shutdown 100 times, no reductions in strength and no reductions in activity of the catalysts were recognized. Thus, the shutdown method for the hydrogen generation apparatus in the present embodiment capable of limiting dew condensation by means of the combination of warm-keeping functioning based on supply of air and warm-keeping functioning with the heaters was recognized as advantageous.

The power consumption in Example 4 was 50 Wh: combustion fan functioning (6 W×60 min) plus second heater 31 functioning (80 W×33 min).

Comparative Example 4

In Comparative Example 4, functions to shut down the hydrogen generation apparatus were performed by using a control flow formed by removing steps 34, 5, 36, and 7 in the control flow shown in FIG. 17. If the detected temperature $T_K$ is equal to or higher than $T_3$ in step 3 in Comparative Example 4, the control returns to step 2. That is, Comparative Example 4 is an example of limiting the occurrence of dew condensation in the converting device 15 and in the CO oxidizing device 16 only with the first heater 30 and the second heater 31.

Figure 19:
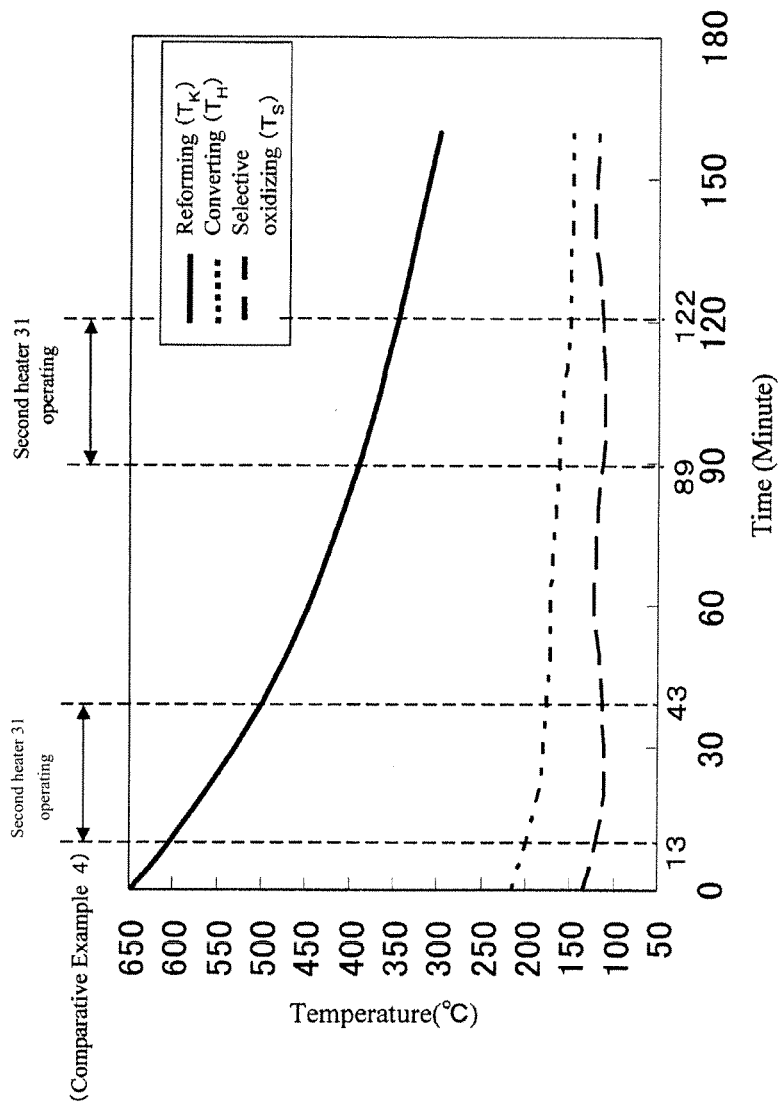
FIG. 19 is a diagram showing a graph of changes in the temperatures of the reforming device, the converting device and the CO oxidizing device with respect to time in Comparative Example 4.

FIG. 19 is a diagram showing a graph of changes in the detected temperature $T_K$, the detected temperature $T_H$ and the detected temperature $T_S$ with respect to time.

The first heater 30 did not function based on steps 2, 3, and 41 to 46. The second heater 31 functioned for 30 minutes from a time 13 minutes after shutdown to a time 43 minutes after shutdown and for 33 minutes from a time 89 minutes after shutdown to a time 122 minutes after shutdown, a total of 66 minutes. When the detected temperature $T_K$ became equal to 300° C., the detected temperature $T_S$ was 119° C. Even after repeating startup and shutdown 100 times, no reductions in strength and no reductions in activity of the catalysts were recognized. It was thereby understood that dew condensation was limited by warm-keeping with the heaters.

The power consumption in Comparative Example 4 was 88 Wh. It can be understood that shutdown can be performed while limiting dew condensation with less energy in Example 4. That is, as shown in Example 4, heat from the reforming device 14 is utilized, though partially, in place of heat from the heaters to limit the reductions in the temperatures of the converting device 15 and the CO oxidizing device 16, thus reducing the power consumption.

In Example 4, with respect to the converting device 15, the temperature at which dew condensation occurs was not reached, even though the first heater 30 was not turned on. If it is known in advance that at the time of supply of the raw material the temperature of the converting device 15 does not reach the temperature at which caution against dew condensation should be exercised, the provision of the first heater 30 is not required.

Embodiment 5

A hydrogen generation apparatus and a fuel cell system having the hydrogen generation apparatus in Embodiment 5 have basically the same configuration as that of the hydrogen generation apparatus and the fuel cell system having the hydrogen generation apparatus in Embodiment 4. However, the configuration in Embodiment 5 differs from that in Embodiment 4 in that the first heater 30 and the second heater 31 are connected in series. That is, while in Embodiment 4 the first heater 30 and the second heater 31 can be individually on-off controlled, the corresponding heaters in the present Embodiment 5 are controllable only in such a way as to be controlled simultaneously with each other. Description will therefore be made mainly of this point of difference. In the present Embodiment 5, the same components as those in Embodiment 4 are indicated by the same reference characters.

Figure 20:
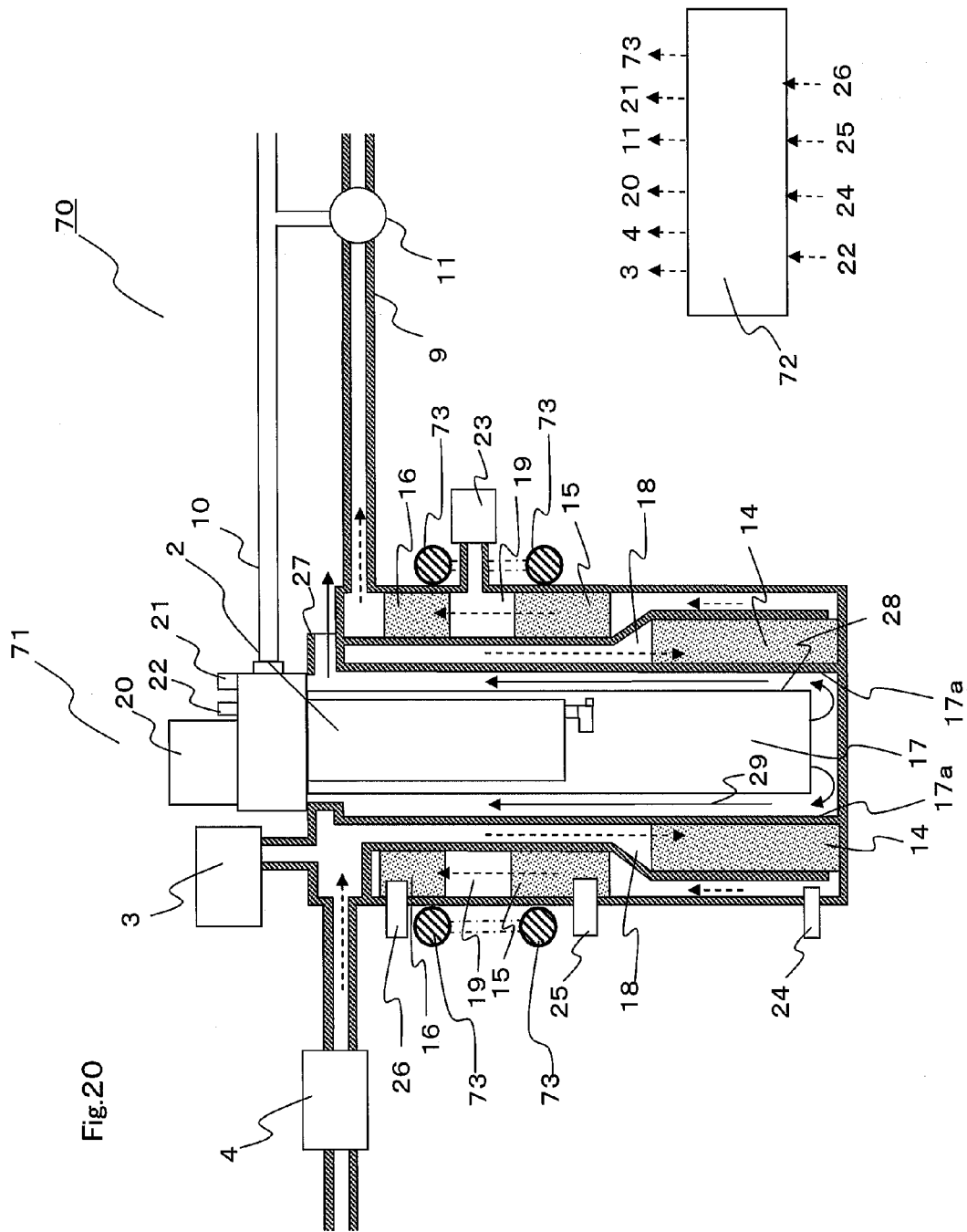
FIG. 20 is a sectional view of the construction of a hydrogen generator in Embodiment 5 of the present disclosure.

FIG. 20 is a sectional configuration diagram of a hydrogen generator 71 of a hydrogen generation apparatus 70 in the present Embodiment 5.

In contrast to the hydrogen generator 61 in Embodiment 4, the hydrogen generator 71 provided in the hydrogen generation apparatus 70 has a double-use heater 73 formed of a first heater and a second heater connected in series. Also, an operation controller 72 which controls the double-use heater 73 is provided in place of the operation controller 62 in Embodiment 4 that controls the first heater 30 and the second heater 31 separately from each other.

The method of shutting down the operation of the hydrogen generation apparatus and the fuel cell system having the hydrogen generation apparatus in the present Embodiment 5 will be described. Operational functioning other than that in the shutdown method is the same as that in Embodiment 4, and the description for it will not be repeated.

Figure 21:
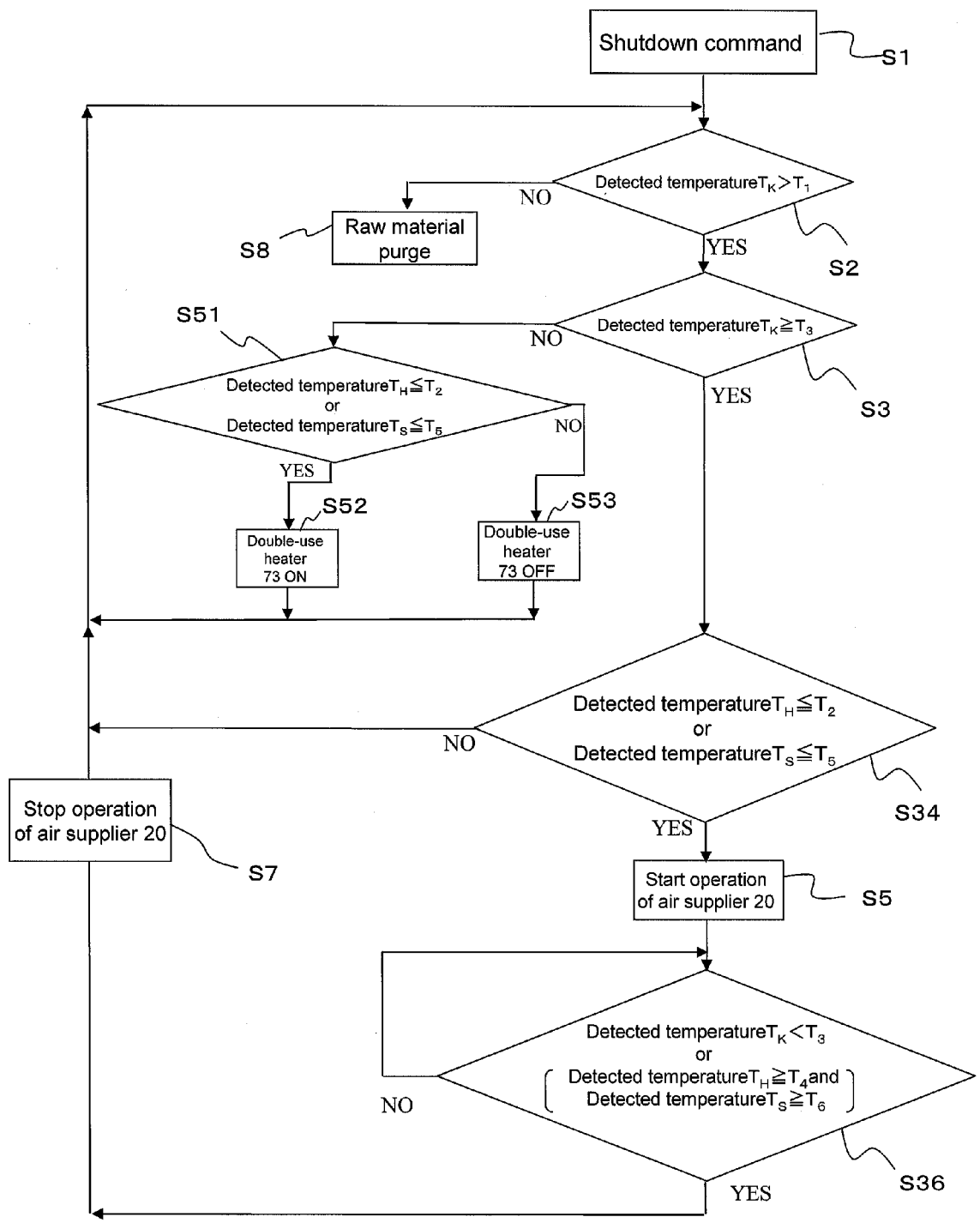
FIG. 21 is a flowchart of a method of shutting down a hydrogen generation apparatus in Embodiment 5 of the present disclosure.

FIG. 21 is a diagram showing the control flow of the method of shutting down the hydrogen generation apparatus 70 in the present Embodiment 5. In the control flow shown in FIG. 21, steps 51 to 53 are provided in place of steps 41 to 46 in Embodiment 4. The same steps as those in Embodiment 4 are indicated by the same reference characters.

As shown in FIG. 21, if in step 3 the detected temperature $T_K$ is lower than the reference temperature $T_3$, the control proceeds to step 51. In step 51, determination is made as to whether or not the detected temperature $T_H$ is equal to or lower than the first reference temperature $T_2$ or whether or not the detected temperature $T_S$ is equal to or lower than the first reference temperature $T_5$.

If the detected temperature $T_H$ is equal to or lower than the first reference temperature $T_2$ or the detected temperature $T_S$ is equal to or lower than the first reference temperature $T_5$, the operation controller 72 sets the double-use heater 73 in the on-state. If the detected temperature $T_H$ is higher than the first reference temperature $T_2$ and the detected temperature $T_S$ is higher than the first reference temperature $T_5$, the operation controller 72 sets the double-use heater 73 in the off-state. That is, control is performed so as to prevent dew condensation by setting the double-use heater 73 in the on-state when at least one of the temperatures of the converting device 15 and the CO oxidizing device 16 becomes smaller than the first reference temperature.

After the shutdown command, the detected temperature $T_K$ does not rise but only decreases. Therefore, once the detected temperature $T_K$ becomes lower than the reference temperature $T_3$ in step 3 or 6, the loop of steps 2, 3, and 51 to 53 is repeated until the detected temperature $T_K$ reaches the temperature $T_1$, thus performing temperature control with the double-use heater 73.

An example of the hydrogen generation apparatus 70 in the present Embodiment 5 will be described. In this example, the hydrogen generation apparatus 70 was evaluated in a single state without being incorporated in the fuel cell system.

Example 5

Functions for shutting down the hydrogen generation apparatus 70 were performed by preparing a program with the temperature $T_1$ set to 300° C., the first reference temperature $T_2$, the second reference temperature $T_4$, the first reference temperature $T_5$ and the second reference temperature $T_6$ each set to 115° C. and the reference temperature $T_3$ set to 400° C. in the control flow of the shutdown method for the hydrogen generation apparatus 70 in FIG. 21. On-off control of the double-use heater 73 formed of the first heater and the second heater connected in series was performed by controlling the voltage so that the double-use heater 73 had a capacity of 300 W. Also, the rate of supply of air by the first air supplier 20 was set to 5 NL/min.

Figure 22:
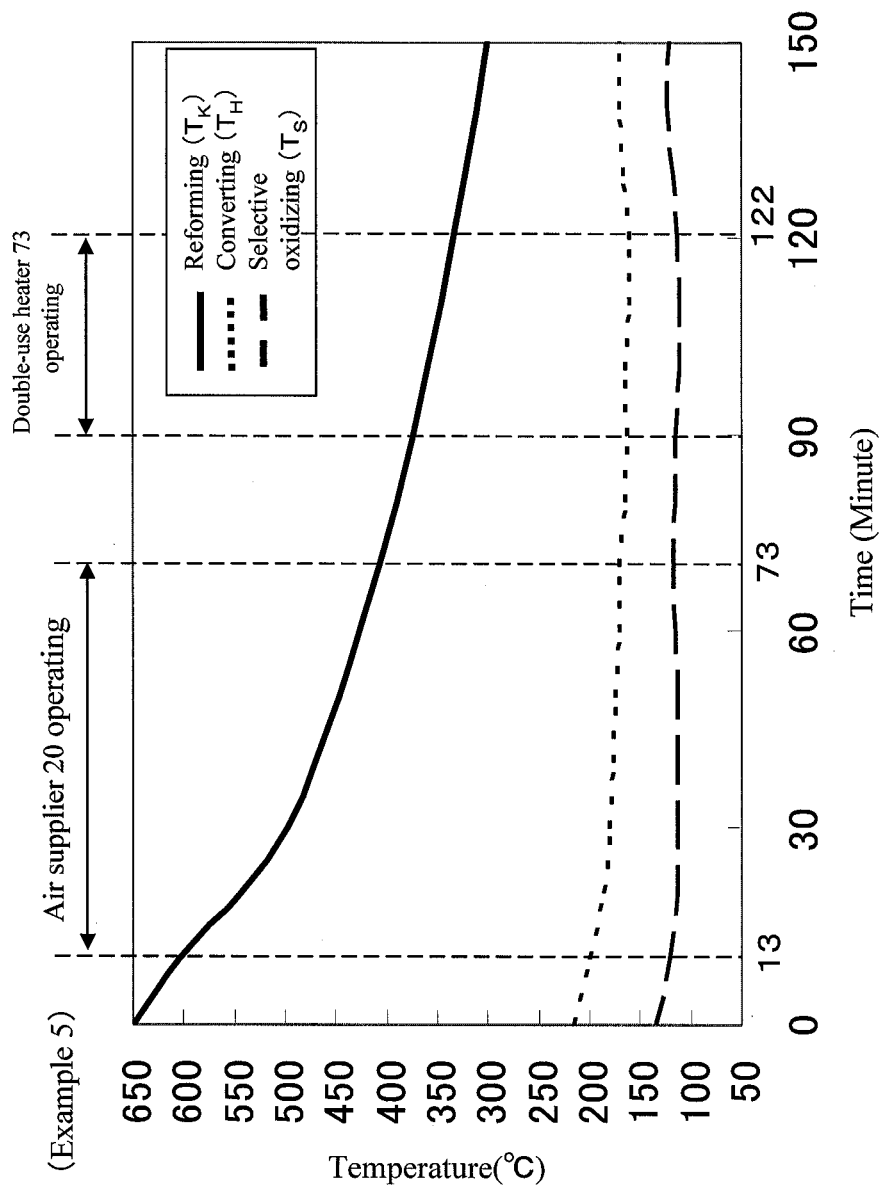
FIG. 22 is a diagram showing a graph of changes in the temperatures of a reforming device, a converting device and a CO oxidizing device with respect to time in Example 5 of the present disclosure.

FIG. 22 is a diagram showing a graph of changes in the detected temperature $T_K$, the detected temperature $T_H$ and the detected temperature $T_S$ with respect to time.

The first air supplier 20 functioned intermittently from a time 13 minutes after shutdown to a time 73 minutes after shutdown on the basis of the flow of steps 2, 3, 34, 5, 36, and 7. The double-use heater formed of the first heater 30 and the second heater 31 connected in series functioned intermittently for 32 minutes from a time 90 minutes after shutdown to a time 122 minutes after shutdown on the basis of steps 2, 3, and 41 to 46.

As a result, when the detected temperature $T_K$ became equal to 300° C., the detected temperature. $T_S$ was 118° C. Even after repeating startup and shutdown 100 times, no reductions in strength and no reductions in activity of the catalysts were recognized. Thus, the shutdown method for the hydrogen generation apparatus in the present embodiment capable of limiting dew condensation by means of the combination of warm-keeping functioning based on supply of air and warm-keeping functioning with the heater was recognized as advantageous.

The power consumption in Example 5 was 166 Wh: combustion fan functioning (6 W×60 min) plus double-use heater 73 functioning (300 W×32 min).

Comparative Example 5

In Comparative Example 5, functions for shutting down the hydrogen generation apparatus were performed by using a control flow formed by removing steps 34, 5, 36, and 7 in the control flow shown in FIG. 21. If the detected temperature $T_K$ is equal to or higher than $T_3$ in step 3 in this comparative example, the control returns to step 2. That is, Comparative Example 5 is an example of limiting the occurrence of dew condensation in the converting device 15 and in the CO oxidizing device 16 only with the double-use heater 73.

Figure 23:
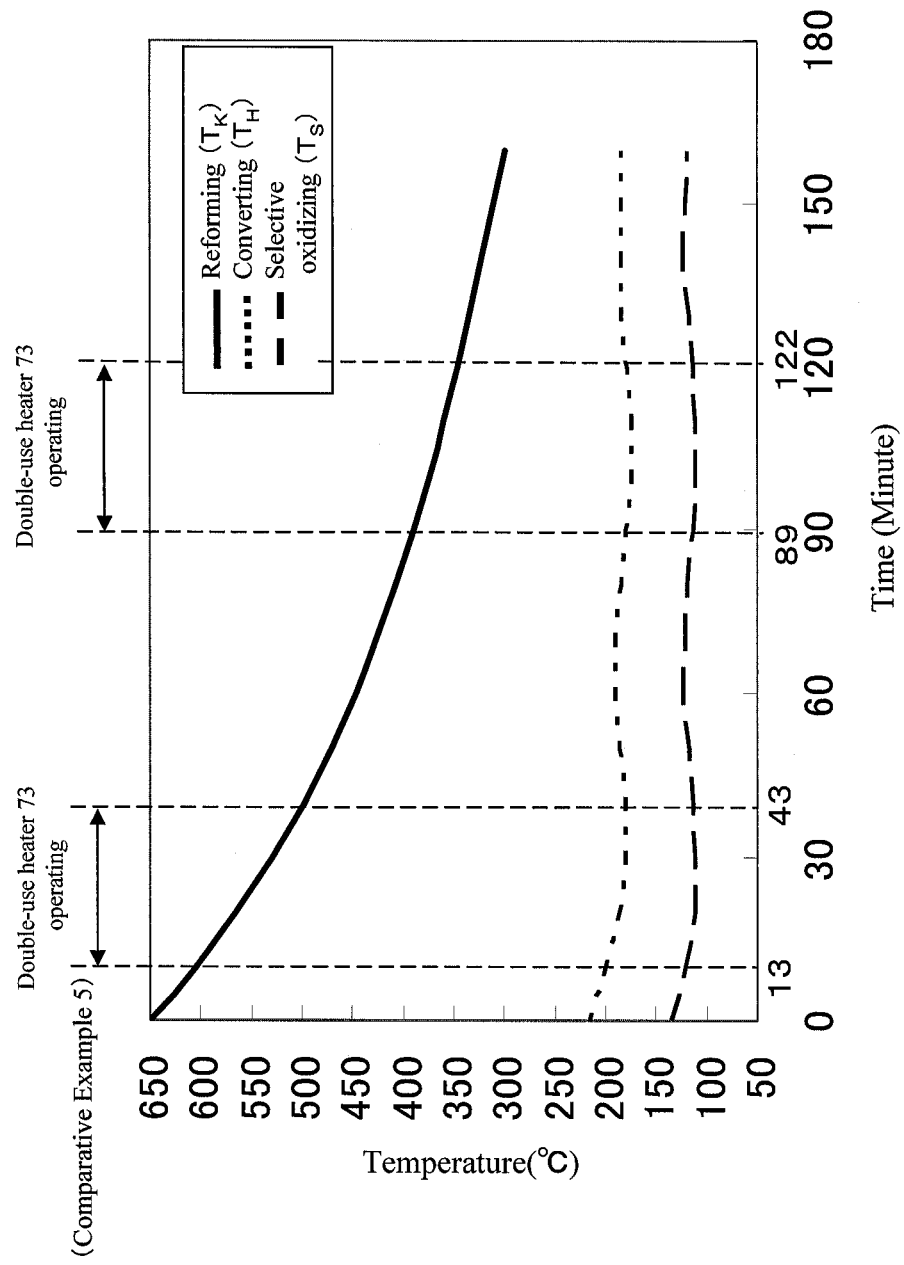
FIG. 23 is a diagram showing a graph of changes in the temperatures of the reforming device, the converting device and the CO oxidizing device with respect to time in Comparative Example 5.

FIG. 23 is a diagram showing a graph of changes in the detected temperature $T_K$, the detected temperature $T_H$ and the detected temperature $T_S$ with respect to time. The double-use heater formed of the first heater 30 and the second heater 31 connected in series functioned for 30 minutes from a time 13 minutes after shutdown to a time 43 minutes after shutdown and for 33 minutes from a time 89 minutes after shutdown to a time 122 minutes after shutdown, a total of 66 minutes, based on steps 2, 3 and 41 to 46.

As a result, when the detected temperature from the first temperature sensor 24 became equal to 300° C., the detected temperature from the third temperature sensor 26 was 118° C. Even after repeating startup and shutdown 100 times, no reductions in strength and no reductions in activity of the catalysts were recognized. It was thereby understood that dew condensation was limited by warm-keeping with the heater.

The power consumption in Comparative Example 5 was 330 Wh. It can be understood that shutdown can be performed while limiting dew condensation with less energy in Example 5. That is, as shown in Example 5, heat from the reforming device 14 is utilized, though partially, in place of heat from the heater to limit the reductions in the temperatures of the converting device 15 and the CO oxidizing device 16, thus reducing the power consumption.

In each of the above-described Embodiments 2, 4, and 5, there is a possibility of the heater being in the on-state at the time of raw material purge. A step of setting the heater in the off-state may therefore be provided before raw material purge. Also, the first air supplier 20 functions in each of the above-described Embodiments 2, 4, and 5. However, a case is possible in which only the heater is in the on-state while the first air supplier 20 is not functioning, depending on charges in temperature reductions in the reaction units with respect to time.

Embodiment 6

In the hydrogen generation apparatuses in Embodiments 1 to 5 described above, time control of the first air supplier 20 may be performed so that the first air supplier 20 is stopped if the second reference temperature $T_4$ or the second reference temperature $T_6$ is not reached even after a lapse of time Ht from a start of supply of air by the first air supplier 20 has exceeded a predetermined reference time $H_1$. This is because in a case where the reference temperature is not reached even after a lapse of the reference time $H_1$, it may be supposed that a malfunction in some portion of the hydrogen generation apparatus, e.g., a malfunction of the first air supplier 20 has occurred.

Figure 24:
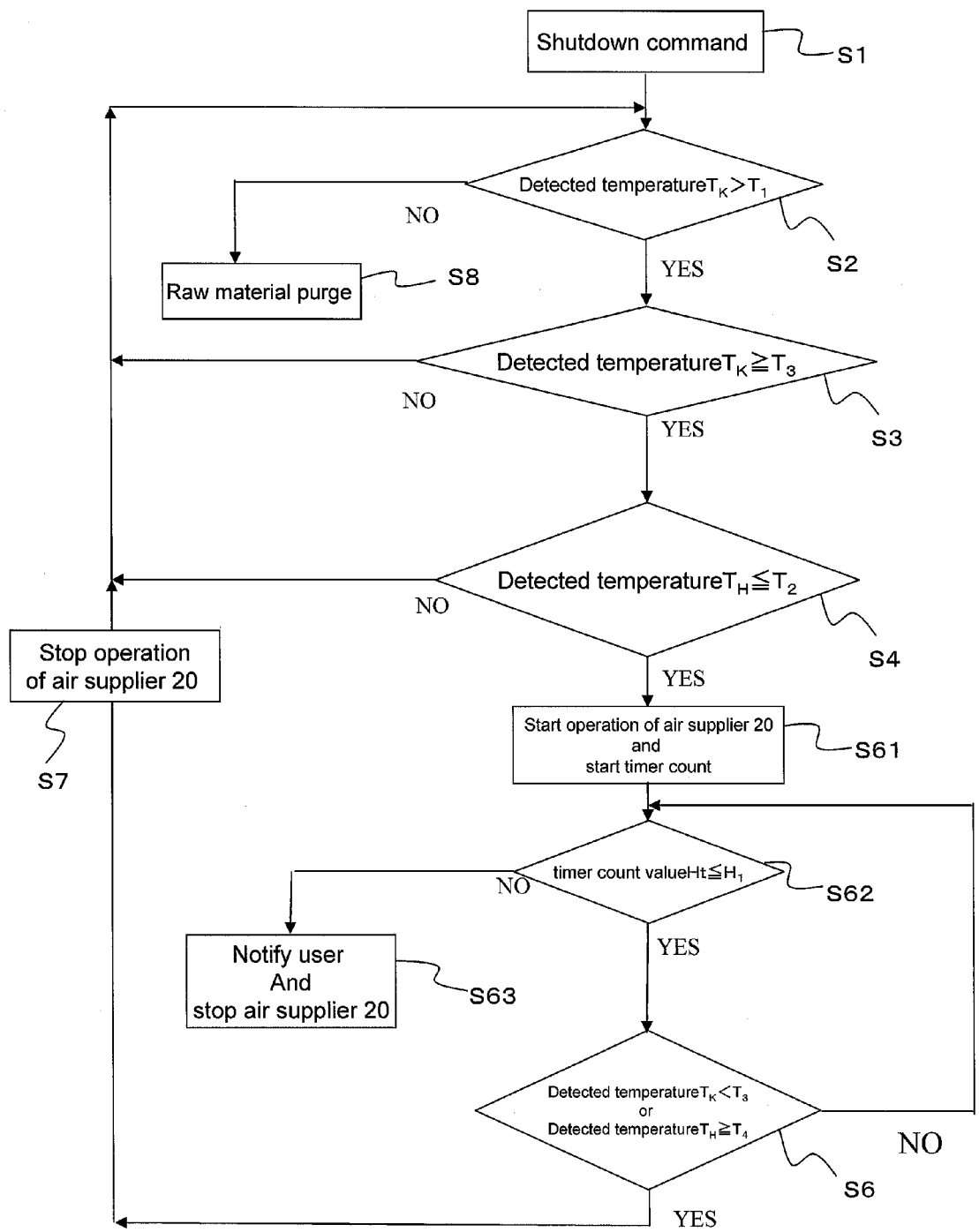
FIG. 24 is a flowchart of a method of shutting down a hydrogen generation apparatus in Embodiment 6 of the present disclosure.

FIG. 24 is a diagram showing a control flow which is a modified example of the control flow of operation shutdown of the hydrogen generation apparatus described in Embodiment 1 with reference to FIG. 3, and in which time control of the first air supplier 20 is incorporated. The control flow in FIG. 24 include, in comparison with FIG. 3, step 61 provided in place of step 5, and step 62 provided between step 61 and step 6. That is, in step 61, timer count Ht is started simultaneously with a start of functioning of the first air supplier 20. When Ht is shorter than the reference time $H_1$, the control proceeds to step 6. If the condition in step 6 is not satisfied, the first air supplier 20 continues functioning until the timer count Ht exceeds the reference time $H_1$ in step 62. When the timer count Ht exceeds the reference time $H_1$, the control proceeds to step 63 and the operation controller 13 notifies a user of the occurrence of an abnormality, and shuts down the first air supplier 20, thereby shutting down the hydrogen generation apparatus 1.

Figure 25:
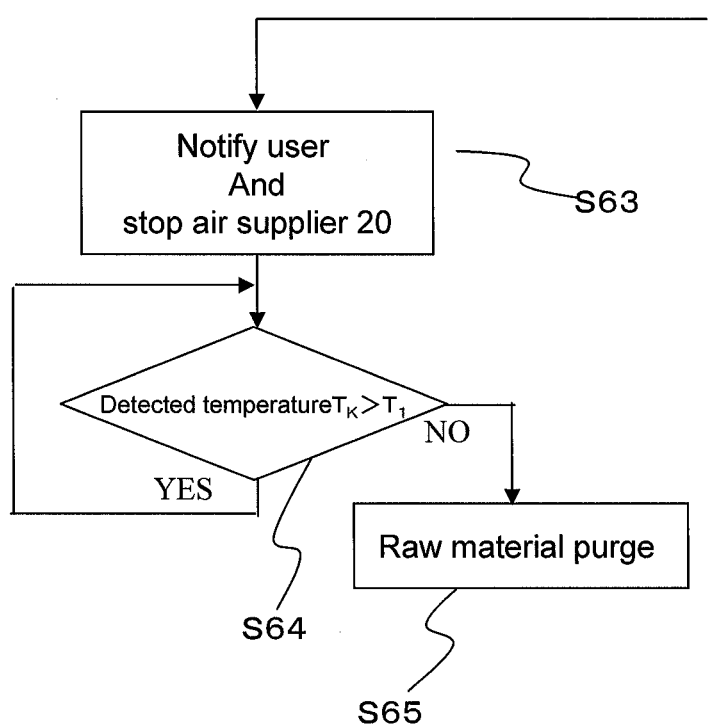
FIG. 25 is a flowchart showing a modified example of FIG. 24.

The hydrogen generation apparatus 1 may be shut down after performing raw material purge after shutdown of the first air supplier 20. FIG. 25 shows the control flow from step 63 in such a case. As shown in FIG. 25, after performing abnormality notification and shutdown of the first air supplier 20 in step 63, natural cooling is performed in step 64 until the detected temperature $T_K$ reaches the temperature $T_1$. When $T_K$ becomes equal to $T_1$, the control proceeds to step 65 to cause the raw material supplier 4 to start functioning, thereby performing raw material purge. After replacement of gases in the hydrogen generation apparatus 1 with the raw material gas, the raw material supplier 4 is shut down, thereby ending raw material purge and shutting down the hydrogen generation apparatus 1. If the condition in step 6 is satisfied, the control proceeds to step 7, as described in Embodiment 1, thereby stopping functioning of the first air supplier 20.

Figure 26:
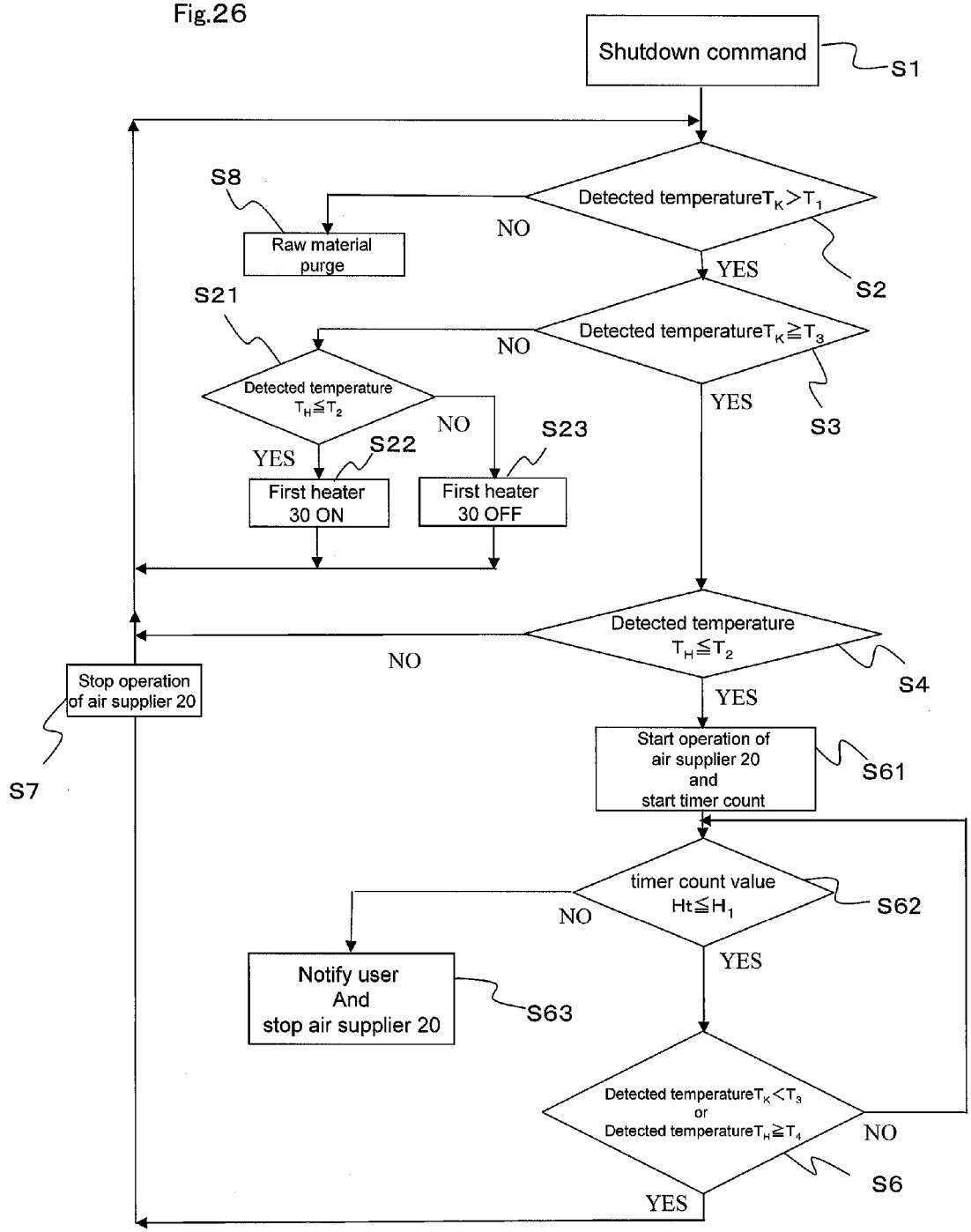
FIG. 26 is a flowchart of a method of shutting down the hydrogen generation apparatus in Embodiment 6 of the present disclosure.

Also, the above-described time control of the first air supplier 20 may be incorporated in the operation shutdown control flow described in Embodiment 2 with reference to FIG. 8. FIG. 26 is a diagram showing a control flow formed by incorporating steps 61 to 63 in FIG. 8. As described above, when the timer count Ht exceeds the reference time $H_1$ in step 61, the control proceeds to step 63 to notify a user of the exceeding of the reference time $H_1$ as an abnormality notification, shut down the first air supplier 20, and shut down the hydrogen generation apparatus 40.

Also in this case, the hydrogen generation apparatus 40 may be shutdown after performing raw material purge after shutdown of the first air supplier 20, as described above with reference to FIG. 25.

Figure 27:
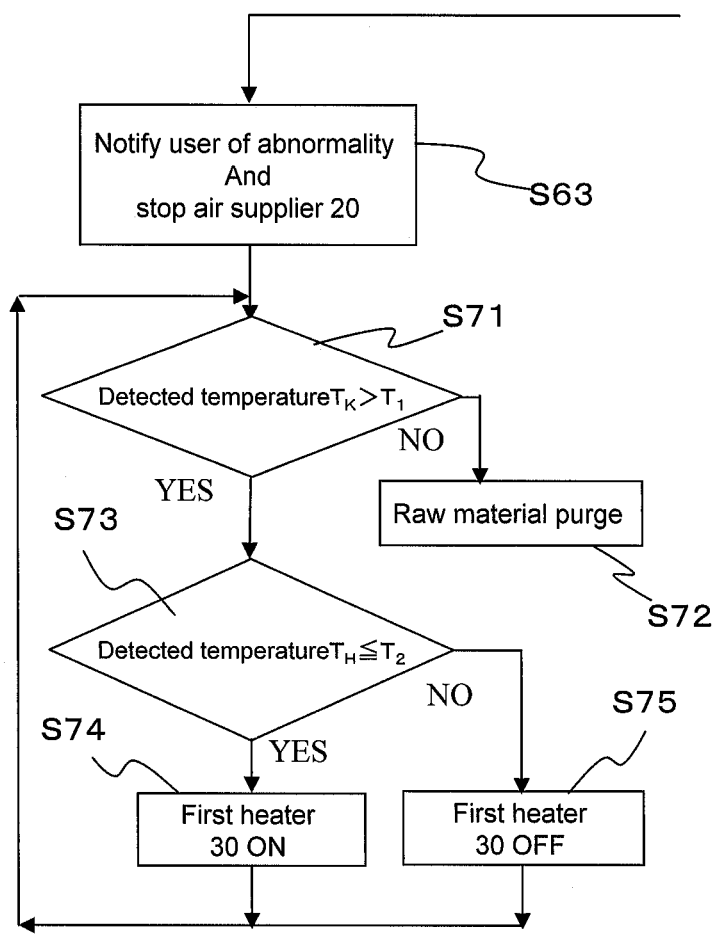
FIG. 27 is a flowchart showing a modified example of FIG. 26.

Further, as shown in FIG. 27, temperature control on the converting device 15 may be performed by using the first heater 30 so that dew condensation does not occur in the converting device 15 after shutdown of the first air supplier 20 and before execution of the raw material purge.

More specifically, after making abnormality notification and shutting down the first air supplier 20 in step S63, the control proceeds to step 71. In step 71, determination is made as to whether or not the detected temperature $T_K$ is higher than the temperature $T_1$. If the detected temperature $T_K$ is higher than the temperature $T_1$, the control proceeds to step 73. If the detected temperature $T_H$ is equal to or lower than the first reference temperature $T_2$, the operation controller 42 sets the first heater 30 in the on-state in step 74. If the detected temperature $T_H$ is higher than the first reference temperature $T_H$ the operation controller 42 sets the first heater 30 in the off-state in step 75. The control then returns to step 71.

That is, control is performed by using the first heater 30 so as to prevent the temperature of the converting device 15 from becoming so low that dew condensation occurs before the detected temperature $T_K$ reaches $T_1$. When the detected temperature $T_K$ reaches $T_1$, the control proceeds to step 72 to perform raw material purge and shut down the hydrogen generation apparatus 40.

Figure 28:
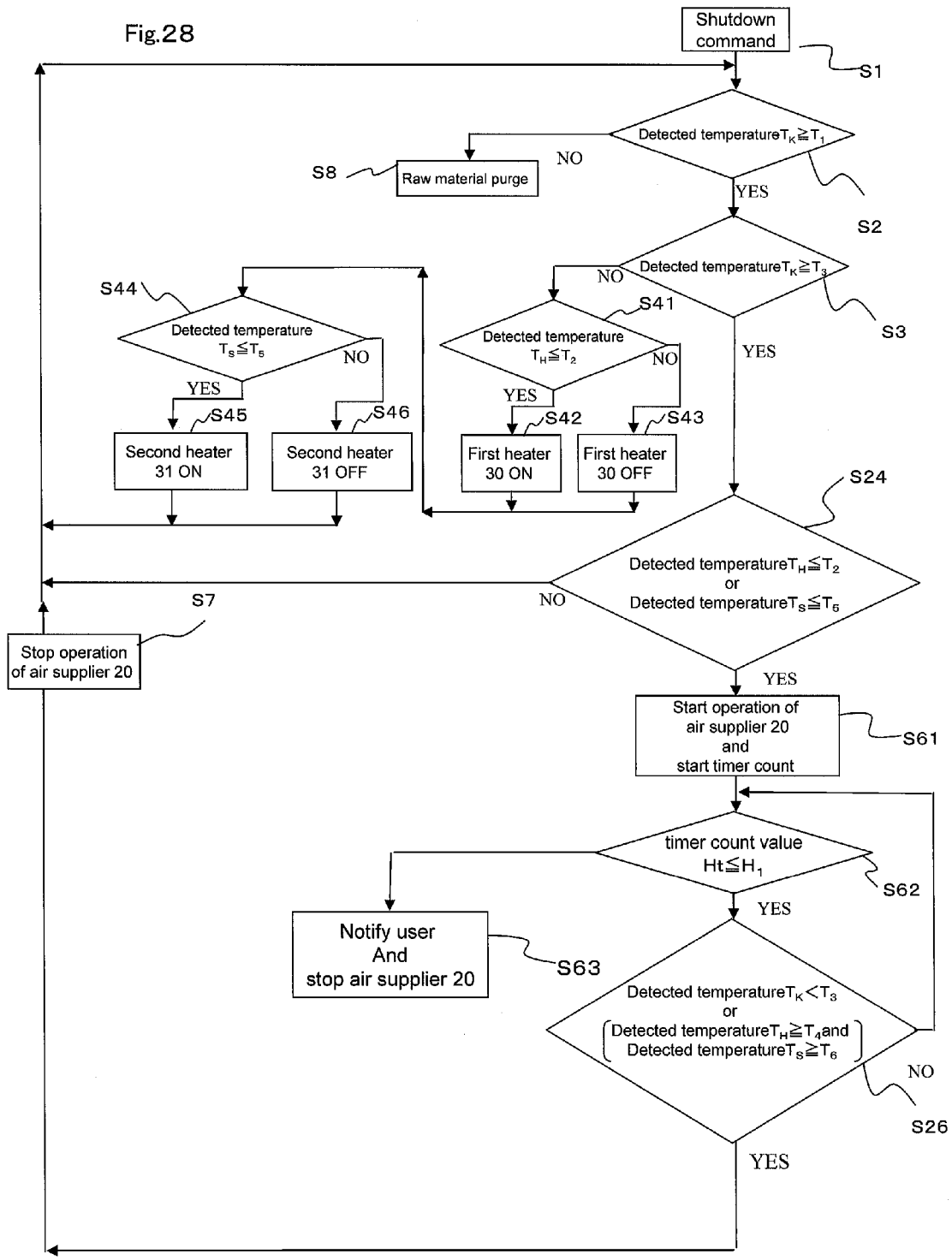
FIG. 28 is a flowchart of a method of shutting down the hydrogen generation apparatus in Embodiment 6 of the present disclosure.

Also, the above-described time control of the first air supplier 20 may be incorporated in the operation shutdown control flow described in Embodiment 4 with reference to FIG. 17. FIG. 28 is a diagram showing a control flow formed by incorporating steps 61 to 63 in FIG. 17. As described above, when the timer count Ht exceeds the reference time $H_1$, the control proceeds to step 63 to notify a user of the occurrence of an abnormality, shut down the first air supplier 20, and shut down the hydrogen generation apparatus 60.

Also in this case, the hydrogen generation apparatus 60 may be shutdown after performing raw material purge after shutdown of the first air supplier 20, as described above with reference to FIG. 25.

Figure 29:
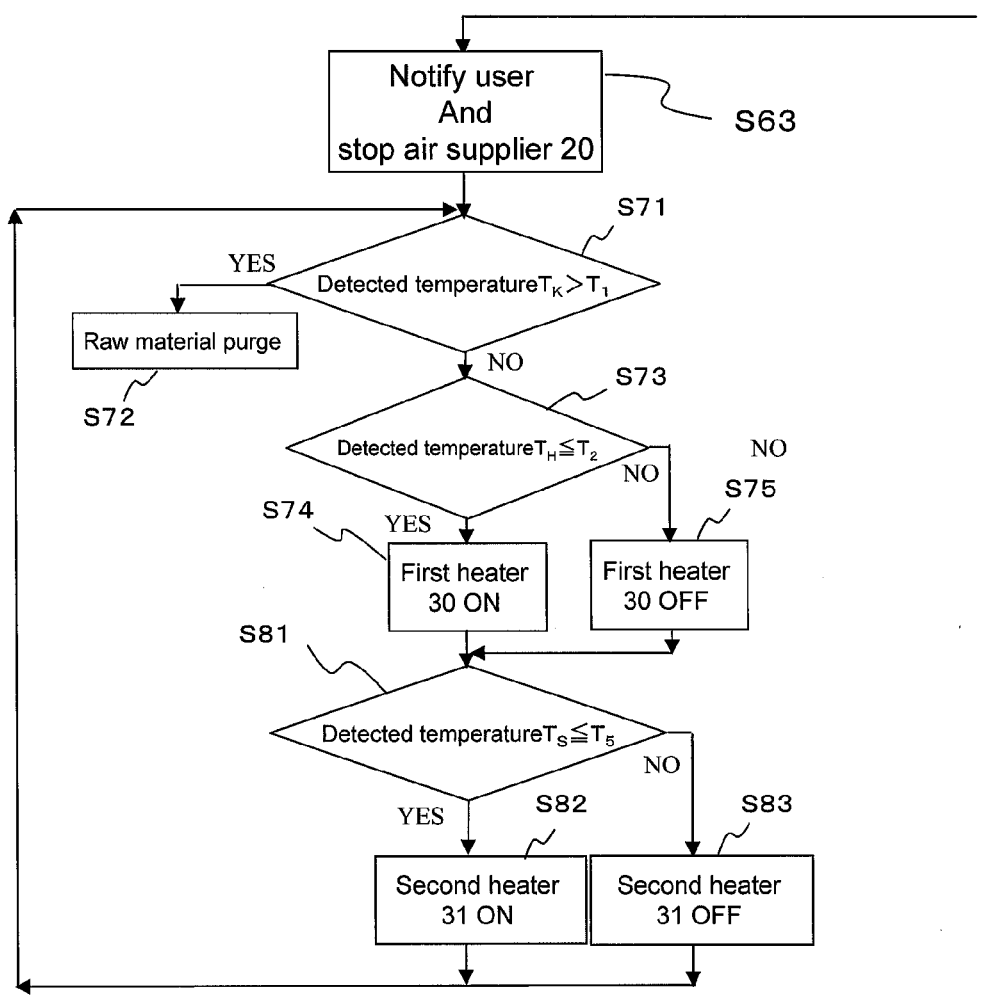
FIG. 29 is a flowchart showing a modified example of FIG. 28.

Further, as shown in FIG. 29, temperature control on the converting device 15 and the CO oxidizing device 16 may be performed by using the first heater 30 and the second heater 31 so that dew condensation does not occur in the converting device 15 and in the CO oxidizing device 16 after shutdown of the first air supplier 20 and before execution of the raw material purge.

More specifically, abnormality notification and shutdown of the first air supplier 20 are performed in step 63. In step 81 after step 74 or step 75 described with reference to FIG. 27, determination is made as to whether or not the detected temperature $T_S$ is equal to or lower than the first reference temperature $T_5$. If the detected temperature $T_S$ is equal to or lower than the first reference temperature $T_5$, the operation controller 62 sets the second heater 31 in the on-state in step 82. If the detected temperature $T_S$ is higher than the first reference temperature $T_5$, the operation controller 62 sets the second heater 31 in the off-state in step 83.

That is, control is performed by using the heaters so as to prevent the temperatures of the converting device 15 and the CO oxidizing device 16 from becoming so low that dew condensation occurs before the detected temperature $T_K$ reaches $T_1$. When the detected temperature $T_K$ reaches $T_1$, the control proceeds to step 72 to perform raw material purge and shut down the hydrogen generation apparatus 60.

In a case where the double-use heater 73 such as described in Embodiment 5 is provided, control may be performed so that the converting device 15 and the CO oxidizing device 16 are warmed with the double-use heater 73 after the timer count Ht has exceeded the reference time $H_1$ to shut down the first air supplier 20 and before the detected temperature $T_K$ decreases to $T_1$.

In the steps 71 to 75 and steps 81 to 83 in the shutdown sequences shown in FIGS. 27 and 29, unlike in steps 21 to 23 and steps 41 to 46, heating with the heaters is executed when the detected temperature $T_K$ is higher than the temperature $T_1$, even if the detected temperature $T_K$ is higher than the reference temperature $T_3$. However, control in this way is preferable from the viewpoint of catalyst protection.

Figure 30:
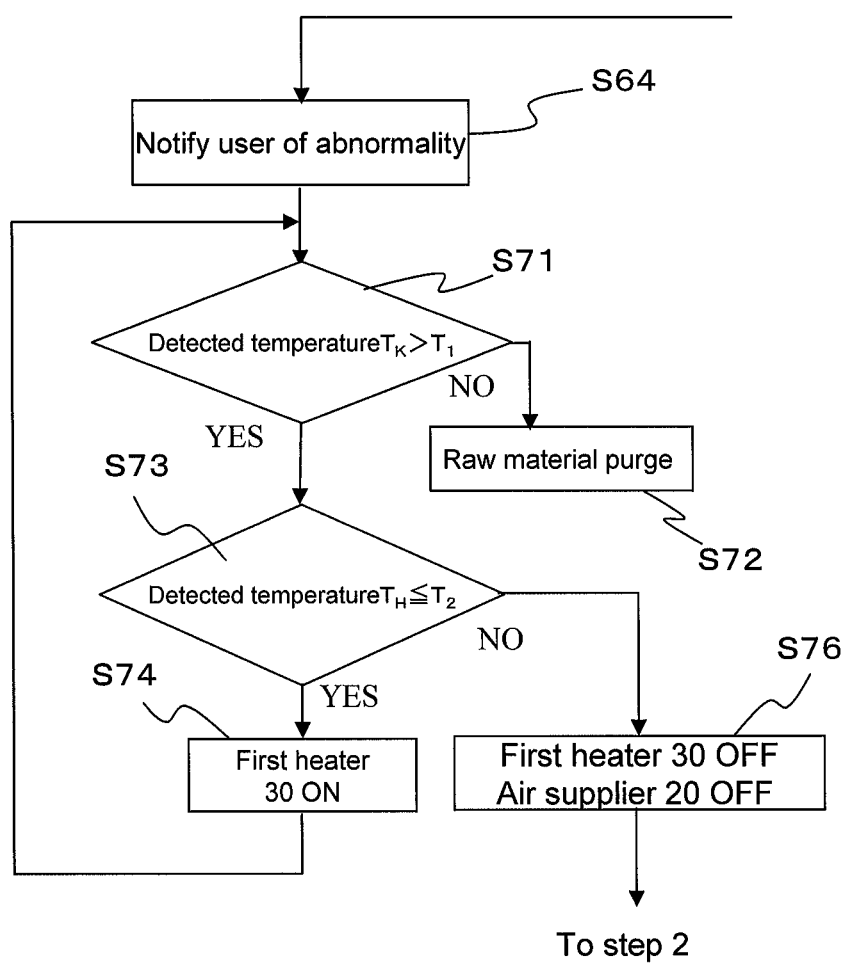
FIG. 30 is a flowchart showing a modified example of FIG. 26.

Shutdown functions in another example of the hydrogen generation apparatus will be described on the basis of the flow shown in FIG. 30. The flows shown in FIGS. 24 to 29 are formed so that functioning of the first air supplier 20 is stopped when the timer counts up in step 62. In contrast, the first air supplier 20 in this modified example of the hydrogen generation apparatus continues functioning.

That is, while the control in FIG. 26 proceeds to step 63 when the timer count Ht exceeds the reference time $H_1$ in step 62, the control in this example proceeds to step 64 in place of step 63.

That is, while abnormality notification to a user is made, the first air supplier 20 is not shut down. Instead, the control proceeds to step 71 and on-off control of the first heater 30 is performed as in the flow shown in FIG. 27.

However, if in step 73 the detected temperature $T_H$ is higher than the reference temperature $T_2$, functioning of the first heater 30 is stopped, functioning of the air supplier 20 is also stopped, and the control returns to step 2.

Thus, if the temperature of the converting device 15 is not increased even when the first air supplier 20 is made to function, it is possible to limit dew condensation by means of the first heater 30 while the functioning is continued.

Embodiments 1 to 6 have been described by assuming use of the fuel cell 100 as a destination to which the gases containing hydrogen produced by the hydrogen generation apparatuses 1, 40, 50, 60, and 70 are supplied. However, the fuel cell 100 is not exclusively used. Other destinations where the gas containing hydrogen is to be used are conceivable.

As a combustion gas to be combusted in the combustor 2, the gas containing hydrogen generated by the hydrogen generation apparatus 1, the hydrogen off-gas expelled from the anode of the fuel cell 100 (i.e., the gas containing hydrogen left unused at the supply destination) or the like is used in the above-described embodiments. Such fuels are fed into the combustor 2 through the anode off gas supply path 10. An arrangement may alternatively adopted in which a raw material directly supplied from the gas infrastructure line 6 is used for combustion.

Figure 31:
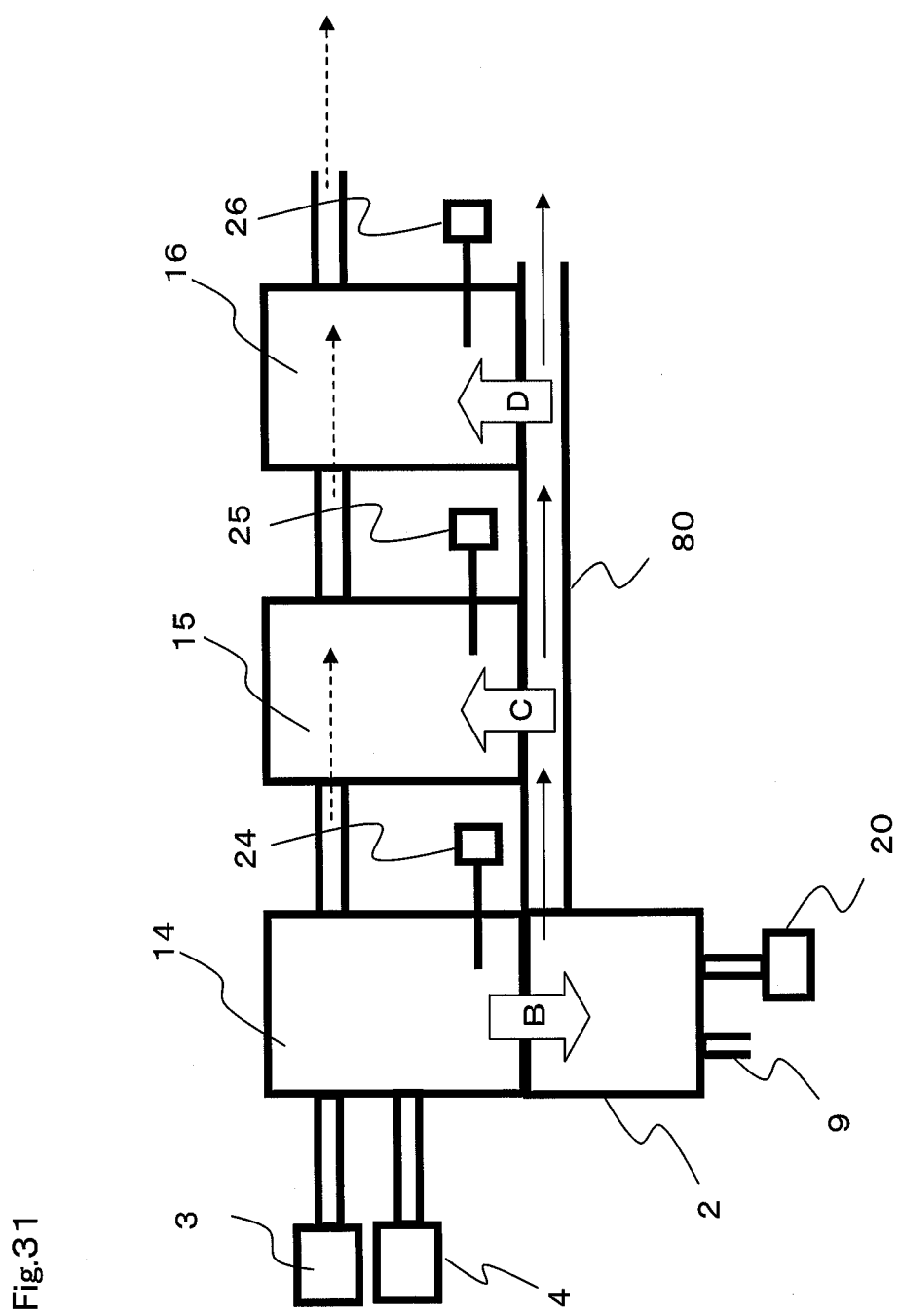
FIG. 31 is a partial configuration diagram showing the configuration of a modified example of the hydrogen generation apparatus of the present disclosure.

In Embodiments 1 to 6, the reforming device 14, the converting device 15 and the CO oxidizing device 16 are provided in one casing. However, the reforming device 14, the converting device 15 and the CO oxidizing device 16 may alternatively be provided in separate casings. For example, a configuration may be adopted in which, as shown in FIG. 31, the reforming device 14, the converting device 15 and the CO oxidizing device 16 are provided in separate casings and connected one another through piping. In the configuration shown in FIG. 31, a combustion exhaust gas path 80 through which combustion exhaust gas generated in the combustor 2 flows is provided adjacent to the converting device 15 and the CO oxidizing device 16 so as to enable heat exchange therebetween. This configuration also enables air (see arrow B) heated by heat held by the reforming device 14 to pass through the combustion exhaust gas path 80, to give heat to the converting device 15 (see arrow C) and to give heat to the CO oxidizing device 16 (see arrow D) when the first air supplier 20 is made to function during shutdown.

In FIG. 31, solid line arrows indicate a flow of air and dotted line arrows indicate a flow of the gas containing hydrogen.

In Embodiments 1 to 6 described above, the first air supplier that supplies air serving as a medium for transferring heat from the reforming device 14 to the converting device 15 or the CO oxidizing device 16 is included in the first air supplier 20 that supplies air for combustion in the combustor 2. However, an arrangement may be adopted in which an air supplier different from an air supplier for supplying air for combustion is separately provided as the first air supplier. In short, it is sufficient to enable causing air to flow so as to supply heat from the reforming device 14 to the converting device 15 or the CO oxidizing device 16.

In the method of shutting down the above-described hydrogen generation apparatus of the present disclosure, a first step of shutting down the combustor and a second step of operating the first air supplier so that the temperature of a gas in the CO reducing device does not become equal to or lower than the dew point after shutdown of the combustor and before a start of a purging operation to purge the interiors of the reforming device and the CO reducing device with a replacement gas may be realized by utilizing a program on a computer.

Further, the above-described program may be used by being recorded on a recording medium processable by the computer.

One utilizing form of the above program may be an aspect of being recorded on a recording medium, ROM and the like are included, which can be read by a computer, and operating with collaborating with the computer.

One utilizing form of the above program may be an aspect of being transmitted inside a transmission medium, transmission media such as the Internet, light, radio waves, and acoustic waves and the like are included, being read by a computer, and operating with collaborating with the computer.

The computer described above is not limited to pure hardware such as a CPU and may be arranged to include firmware, an OS and, furthermore, peripheral devices.

Moreover, as described above, configurations of the present disclosure may either be realized through software or through hardware.

INDUSTRIAL APPLICABILITY

A hydrogen generation apparatus and a method of shutting down the hydrogen generation apparatus according to the present disclosure have an effect that limiting degradation of a catalyst due to dew condensation at the time of shutdown is capable, and are useful in a fuel cell system or the like.

DESCRIPTION OF SYMBOLS 1, 40, 50, 60, 70 hydrogen generation apparatus
2 combustor
3 water supplier
4 raw material supplier
5 desulfurizer
6 gas infrastructure
7 connection portion
8, 41, 51, 61, 71 hydrogen generator
9 hydrogen gas supply path
10 anode off gas supply path
11 three-way valve
12 bypass path
13 operation controller
14 reforming device
15 converting device
16 CO oxidizing device
17 combustion space
18 first annular space
19 second annular space
20 first air supplier
21 igniter
22 flame rod
23 second air supplier
24 first temperature sensor
25 second temperature sensor
26 third temperature sensor
27 exhaust port
28 combustion cylinder
29, 80 combustion exhaust gas path
30 first heater
31 second heater
73 double-use heater

The invention claimed is:

1. A method of shutting down a hydrogen generation apparatus comprising a raw material supplier which supplies a raw material, a water supplier which supplies water, a reforming device having a reforming catalyst for generating a gas containing hydrogen through reforming reaction using the raw material and the water, a CO reducing device having a CO reducing catalyst for reducing carbon monoxide in the gas containing hydrogen delivered from the reforming device, a combustor which supplies heat necessary for the reforming reaction to the reforming device, a first air supplier which supplies air for combustion to the combustor, and a combustion exhaust gas path formed such that the combustion exhaust gas exhausted from the combustor makes heat exchange with the reforming device and then with the CO reducing device, the method comprising:
a first step of stopping a combustion operation of the combustor; and
a second step of allowing, by operating the first air supplier and supplying air through the combustion exhaust gas path, the supplied air to make heat exchange with the reforming device and then with the CO reducing device so that a temperature of a gas in the CO reducing device does not become equal to or lower than a dew point after shutdown of the combustion operation of the combustor and before a start of a purging operation to purge interiors of the reforming device and the CO reducing device with a replacement gas.

2. A method of shutting down a hydrogen generation apparatus according to claim 1, wherein
in the second step, the first air supplier is intermittently operated and controlled so that the temperature of the gas in the CO reducing device does not become equal to or lower than the dew point.

3. A method of shutting down a hydrogen generation apparatus according to claim 2, wherein
in the second step, the first air supplier is operated when the temperature of the gas in the CO reducing device is equal to or lower than a first temperature higher than the dew point.

4. A method of shutting down a hydrogen generation apparatus according to claim 3, wherein
the operation of the first air supplier is stopped when the temperature of the gas in the CO reducing device becomes equal to or higher than a second temperature higher than the first temperature as a result of the operation of the first air supplier in the second step.

5. A method of shutting down a hydrogen generation apparatus according to claim 3, wherein
the operation of the first air supplier is stopped when the temperature of the gas in the CO reducing device does not become equal to or higher than a second temperature higher than the first temperature as a result of the operation of the first air supplier in the second step.

6. A method of shutting down a hydrogen generation apparatus according to claim 5, wherein
the hydrogen generation apparatus comprises a heater which heats the CO reducing device, and
the heater is operated when the second temperature is not reached or exceeded in the second step.

7. A method of shutting down a hydrogen generation apparatus according to claim 1, wherein
in the second step, when a temperature of the gas in the reforming device is equal to or higher than a third temperature, the first air supplier is operated and controlled so that the temperature of the gas in the CO reducing device does not become equal to or lower than the dew point.

8. A method of shutting down a hydrogen generation apparatus according to claim 7, wherein
the hydrogen generation apparatus comprises a heater which heats the CO reducing device, and
in the second step, when the temperature of the gas in the reforming device is lower than the third temperature, the heater is operated and controlled so that the temperature of the gas in the CO reducing device does not become equal to or lower than the dew point.

9. A method of shutting down a hydrogen generation apparatus according to claim 1, wherein
the hydrogen generation apparatus comprises a heater which heats the CO reducing device, and
in the second step, the first air supplier is operated and the heater is operated.

10. A method of shutting down a hydrogen generation apparatus according to claim 1, wherein
the CO reducing device is at least one of a converting device, a CO oxidizing device, and a CO methanizer.

11. A method of operating a fuel cell system comprising a hydrogen generation apparatus which comprises a raw material supplier which supplies a raw material, a water supplier which supplies water, a reforming device having a reforming catalyst for generating a gas containing hydrogen through reforming reaction using the raw material and the water, a CO reducing device having a CO reducing catalyst for reducing carbon monoxide in the gas containing hydrogen delivered from the reforming device, a combustor which supplies heat necessary for the reforming reaction to the reforming device, a first air supplier which supplies air for combustion to the combustor, and a combustion exhaust gas path formed such that the combustion exhaust gas exhausted from the combustor makes heat exchange with the reforming device and then with the CO reducing device, and a fuel cell which generates electric power by using the gas containing hydrogen supplied from the hydrogen generation apparatus, the method comprising:
a first step of stopping a combustion operation of the combustor; and
a second step of allowing, by operating the first air supplier and supplying air through the combustion exhaust gas path, the supplied air to make heat exchange with the reforming device and then with the CO reducing device so that a temperature of a gas in the CO reducing device does not become equal to or lower than a dew point after shutdown of the combustion operation of the combustor and before a start of a purging operation to purge interiors of the reforming device and the CO reducing device with a replacement gas.

* * * * *